US009277043B1

(12) United States Patent
Bladon et al.

(10) Patent No.: US 9,277,043 B1
(45) Date of Patent: Mar. 1, 2016

(54) METHODS AND SYSTEMS FOR MANAGING TELECOMMUNICATIONS AND FOR TRANSLATING VOICE MESSAGES TO TEXT MESSAGES

(71) Applicant: CALLWAVE COMMUNICATIONS, LLC, Brookline, MA (US)

(72) Inventors: Anthony Bladon, Santa Barbara, CA (US); David Giannini, Santa Barbara, CA (US); David Frank Hofstatter, Santa Barbara, CA (US); Colin Kelley, Santa Barbara, CA (US); David C. McClintock, Santa Barbara, CA (US); Robert F. Smith, Santa Barbara, CA (US); David S. Trandal, Santa Barbara, CA (US); Leland W. Kirchhoff, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

(21) Appl. No.: 14/637,003

(22) Filed: Mar. 3, 2015

Related U.S. Application Data

(63) Continuation of application No. 14/221,178, filed on Mar. 20, 2014, now Pat. No. 8,977,248, which is a continuation of application No. 13/898,001, filed on May 20, 2013, now Pat. No. 8,688,092, which is a (Continued)

(51) Int. Cl.
*H04M 1/725* (2006.01)
*H04M 3/533* (2006.01)
(Continued)

(52) U.S. Cl.
CPC ............. *H04M 1/7255* (2013.01); *G10L 15/26* (2013.01); *H04M 3/5335* (2013.01); *H04M 3/53341* (2013.01); *H04W 4/14* (2013.01)

(58) Field of Classification Search
CPC .......... H04M 1/7255; H04M 3/53341; H04M 3/5335; G10L 15/26; H04W 4/14

USPC ......... 455/412.2, 414.4; 370/300; 379/71, 80, 379/85, 88.22, 88.25, 88.26; 704/200, 201, 704/251
See application file for complete search history.

(56) References Cited

U.S. PATENT DOCUMENTS 3,936,613 A 2/1976 Nishigori et al.
3,956,595 A 5/1976 Sobanski
(Continued)

FOREIGN PATENT DOCUMENTS

CA 1329852 9/1989
EP 1 120 954 8/2001
(Continued)

OTHER PUBLICATIONS

"Entrepreneur of the Year awards—benchmark to the global economy," *The Business Magazine (Thames Valley)*, Web Site: http://www.eoy.co.uk. (2006).

(Continued)

*Primary Examiner* — Amancio Gonzalez
(74) *Attorney, Agent, or Firm* — Knobbe, Martens, Olson & Bear LLP

(57) ABSTRACT

Systems and methods that can be utilized to convert a voice communication received over a telecommunication network to text are described. In an illustrative embodiment, a call processing system coupled to a telecommunications network receives a call from a caller intended for a first party, wherein the call is associated with call signaling information. At least a portion of the call signaling information is stored in a computer readable medium. A greeting is played the caller, and a voice communication from the caller is recorded. At least a portion of the voice communication is converted to text, which is analyzed to identify portions that are inferred to be relatively more important to communicate to the first party. A text communication is generated including at least some of the identified portions and including fewer words than the recorded voice communication. At least a portion of the text communication is made available to the first party over a data network.

20 Claims, 7 Drawing Sheets

Related U.S. Application Data continuation of application No. 12/046,305, filed on Mar. 11, 2008, now Pat. No. 8,447,285.

(60) Provisional application No. 60/908,169, filed on Mar. 26, 2007, provisional application No. 60/914,172, filed on Apr. 26, 2007, provisional application No. 60/944,243, filed on Jun. 15, 2007, provisional application No. 60/948,413, filed on Jul. 6, 2007, provisional application No. 60/975,492, filed on Sep. 26, 2007.

(51) Int. Cl.
*H04W 4/14* (2009.01)
*G10L 15/26* (2006.01)

(56) References Cited

U.S. PATENT DOCUMENTS

| | | | |
|---|---|---|---|
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,407 A | 6/1996 | Russell et al. |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,619,557 A | 4/1997 | Van Berkum |
| 5,619,708 A | 4/1997 | Ho |
| 5,640,677 A | 6/1997 | Karlsson |
| 5,651,054 A | 7/1997 | Dunn et al. |
| 5,668,861 A | 9/1997 | Watts |
| 5,668,928 A | 9/1997 | Groner |
| 5,729,741 A | 3/1998 | Liaguno et al. |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,304,565 B1 | 10/2001 | Ramamurthy |
| 6,310,939 B1 | 10/2001 | Varney |
| 6,333,973 B1 | 12/2001 | Smith et al. |
| 6,350,066 B1 | 2/2002 | Bobo, II |
| 6,353,660 B1 | 3/2002 | Burger et al. |
| 6,353,663 B1 | 3/2002 | Stevens et al. |
| 6,356,662 B1 | 3/2002 | Tsai |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,438,216 B1 | 8/2002 | Aktas |
| 6,438,222 B1 | 8/2002 | Burg |
| 6,442,250 B1 | 8/2002 | Troen-Krasnow et al. |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,507,643 B1 | 1/2003 | Groner |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,526,127 B1 | 2/2003 | Piotrowski et al. |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,606,373 B1 | 8/2003 | Martin |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,662,232 B1 | 12/2003 | Nicholls et al. |
| 6,687,340 B1 | 2/2004 | Goldberg et al. |
| 6,690,785 B1 | 2/2004 | Stelter et al. |
| 6,751,297 B2 | 6/2004 | Nelkenbaum |
| 6,751,299 B1 | 6/2004 | Brown et al. |
| 6,775,370 B2 | 8/2004 | Burg |
| 6,775,651 B1 | 8/2004 | Lewis et al. |
| 6,782,088 B1 | 8/2004 | Gabara |
| 6,785,021 B1 | 8/2004 | Gordon et al. |
| 6,792,094 B1 | 9/2004 | Kirkpatrick |
| 6,804,334 B1 | 10/2004 | Beasley et al. |
| 6,813,603 B1 | 11/2004 | Groner et al. |
| 6,857,074 B2 | 2/2005 | Bobo, II |
| 6,865,260 B1 | 3/2005 | Meadows et al. |
| 6,898,275 B2 | 5/2005 | Dolan et al. |
| 6,968,174 B1 | 11/2005 | Trandal et al. |
| 7,003,087 B2 | 2/2006 | Spencer et al. |
| 7,058,573 B1 | 6/2006 | Murveit et al. |
| 7,065,186 B1 | 6/2006 | Myers et al. |
| 7,085,716 B1 | 8/2006 | Even et al. |
| 7,103,154 B1 | 9/2006 | Cannon et al. |
| 7,120,455 B1 | 10/2006 | Chen et al. |
| 7,136,462 B2 | 11/2006 | Pelaez et al. |
| 7,170,978 B2 | 1/2007 | Idren |
| 7,191,135 B2 | 3/2007 | O'Hagan |
| 7,206,389 B1 | 4/2007 | Dumoulin et al. |
| 7,209,964 B2 | 4/2007 | Dugan et al. |
| 7,302,539 B2 | 11/2007 | Korgaonkar et al. |
| 7,310,601 B2 | 12/2007 | Nishizaki et al. |
| 7,316,354 B2 | 1/2008 | Davis |
| 7,319,742 B2 | 1/2008 | Levine |
| 7,324,939 B1 | 1/2008 | Cardillo et al. |
| 7,324,940 B1 | 1/2008 | Miller et al. |
| 7,324,943 B2 | 1/2008 | Rigazio et al. |

(56) References Cited

U.S. PATENT DOCUMENTS

| | | | |
|---|---|---|---|
| 7,327,696 B1 | 2/2008 | Yarlagadda | |
| 7,327,723 B2 | 2/2008 | Kurganov | |
| 7,369,653 B2 | 5/2008 | Dezonno et al. | |
| 7,388,949 B2 | 6/2008 | Contractor et al. | |
| 7,412,050 B2 | 8/2008 | Renner et al. | |
| 7,447,510 B2 | 11/2008 | Celik et al. | |
| 7,539,086 B2 * | 5/2009 | Jaroker | 369/25.01 |
| 7,647,350 B2 | 1/2010 | Parkinson et al. | |
| 7,702,792 B2 | 4/2010 | Shaffer et al. | |
| 7,716,186 B2 | 5/2010 | Cannon | |
| 7,826,605 B1 | 11/2010 | Vanier et al. | |
| 7,903,795 B2 | 3/2011 | Hiatt et al. | |
| 7,979,403 B2 | 7/2011 | Kedem et al. | |
| 8,073,429 B2 | 12/2011 | Karaoguz et al. | |
| 8,208,796 B2 | 6/2012 | Prus | |
| 8,214,338 B1 | 7/2012 | Kirchhoff et al. | |
| 8,244,540 B2 * | 8/2012 | Proux et al. | 704/270 |
| 8,325,886 B1 | 12/2012 | Kirchhoff et al. | |
| 8,447,285 B1 | 5/2013 | Bladon et al. | |
| 8,582,729 B2 * | 11/2013 | Minear | 379/88.18 |
| 8,688,092 B1 | 4/2014 | Bladon et al. | |
| 2002/0010616 A1 | 1/2002 | Itzhaki | |
| 2002/0097710 A1 | 7/2002 | Burg | |
| 2002/0176548 A1 | 11/2002 | Watts | |
| 2002/0178002 A1 | 11/2002 | Boguraev et al. | |
| 2003/0016792 A1 | 1/2003 | Skladman et al. | |
| 2003/0026393 A1 | 2/2003 | Skladman et al. | |
| 2003/0039339 A1 | 2/2003 | Luehrig et al. | |
| 2003/0063731 A1 | 4/2003 | Woodring | |
| 2003/0123629 A1 | 7/2003 | Hussain et al. | |
| 2003/0142807 A1 | 7/2003 | Dolan et al. | |
| 2003/0156700 A1 | 8/2003 | Brown et al. | |
| 2003/0220784 A1 | 11/2003 | Fellenstein et al. | |
| 2004/0028203 A1 | 2/2004 | Wurster et al. | |
| 2004/0076272 A1 | 4/2004 | Zafar et al. | |
| 2004/0105536 A1 | 6/2004 | Williams | |
| 2004/0185883 A1 | 9/2004 | Rukman | |
| 2004/0190703 A1 | 9/2004 | Trandal et al. | |
| 2004/0190706 A1 | 9/2004 | Fleischer, III et al. | |
| 2004/0240641 A1 | 12/2004 | Cohen et al. | |
| 2004/0252679 A1 | 12/2004 | Williams et al. | |
| 2004/0258220 A1 | 12/2004 | Levine et al. | |
| 2005/0010573 A1 | 1/2005 | Garg | |
| 2005/0013419 A1 | 1/2005 | Pelaez et al. | |
| 2005/0053216 A1 | 3/2005 | Spencer et al. | |
| 2005/0078612 A1 | 4/2005 | Lang | |
| 2005/0119019 A1 | 6/2005 | Jang | |
| 2005/0123118 A1 | 6/2005 | Terry et al. | |
| 2005/0129206 A1 | 6/2005 | Martin | |
| 2005/0136955 A1 | 6/2005 | Mumick et al. | |
| 2005/0141678 A1 | 6/2005 | Anders | |
| 2005/0171936 A1 | 8/2005 | Zhu | |
| 2005/0207556 A1 | 9/2005 | Gonzalez et al. | |
| 2005/0265322 A1 | 12/2005 | Hester | |
| 2005/0288005 A1 | 12/2005 | Roth et al. | |
| 2006/0013374 A1 | 1/2006 | Fleischer, III et al. | |
| 2006/0045255 A1 | 3/2006 | Peters et al. | |
| 2006/0058052 A1 | 3/2006 | Plestid et al. | |
| 2006/0141962 A1 | 6/2006 | Forbes et al. | |
| 2006/0143307 A1 | 6/2006 | Codignotto | |
| 2006/0168015 A1 | 7/2006 | Fowler | |
| 2006/0172749 A1 | 8/2006 | Sweeney | |
| 2006/0223502 A1 | 10/2006 | Doulton | |
| 2006/0234680 A1 | 10/2006 | Doulton | |
| 2006/0234735 A1 | 10/2006 | Digate et al. | |
| 2006/0256934 A1 | 11/2006 | Mazor | |
| 2007/0054678 A1 | 3/2007 | Doulton | |
| 2007/0093255 A1 | 4/2007 | Nurminen et al. | |
| 2007/0116194 A1 | 5/2007 | Agapi et al. | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117546 A1 | 5/2007 | Doulton | |
| 2007/0117547 A1 | 5/2007 | Doulton | |
| 2007/0118357 A1 | 5/2007 | Kasravi et al. | |
| 2007/0126875 A1 | 6/2007 | Miyamaki | |
| 2007/0127638 A1 | 6/2007 | Doulton | |
| 2007/0127657 A1 | 6/2007 | Shaffer et al. | |
| 2007/0127688 A1 | 6/2007 | Doulton | |
| 2007/0178919 A1 | 8/2007 | Huggett et al. | |
| 2007/0183405 A1 | 8/2007 | Bennett | |
| 2007/0217579 A1 | 9/2007 | Sobti et al. | |
| 2007/0245024 A1 | 10/2007 | Prus | |
| 2007/0274465 A1 | 11/2007 | Othmer | |
| 2007/0280434 A1 | 12/2007 | Howell et al. | |
| 2008/0040673 A1 | 2/2008 | Zuckerberg et al. | |
| 2008/0076409 A1 | 3/2008 | Hinrikus et al. | |
| 2008/0081662 A1 | 4/2008 | Strandell et al. | |
| 2008/0109422 A1 | 5/2008 | Dedhia | |
| 2008/0140398 A1 | 6/2008 | Shpigel | |
| 2008/0152101 A1 | 6/2008 | Griggs | |
| 2008/0177786 A1 | 7/2008 | Faisman et al. | |
| 2008/0178225 A1 | 7/2008 | Jost | |
| 2008/0229048 A1 | 9/2008 | Murase et al. | |
| 2009/0067586 A1 | 3/2009 | Fano et al. | |
| 2010/0184409 A1 | 7/2010 | Doulton | |
| 2011/0113343 A1 | 5/2011 | Trauth | |
| 2011/0196926 A1 | 8/2011 | Crawford | |
| 2011/0268260 A1 | 11/2011 | Madhavapeddi et al. | |

FOREIGN PATENT DOCUMENTS

| | | |
|---|---|---|
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

OTHER PUBLICATIONS

Final Office Action for U.S. Appl. No. 12/125,746, mailed Nov. 30, 2011.

Grenville, Mike (2006) "News: Mobile wins startup awards, 82ASK and Spinvox have both won Start Up Awards," *160Characters SMS & Mobile Messaging Association*.

Holahan, Catherine (2007) "The twitterization of blogs," *Business Week*.

Johnson, Dave; Article; "Now You're Talking—voice—response systems for home offices—Product Information"; http://www.findarticles.com; Feb. 1999.

La Monica, Paul R. (2007) "Leave your blog after the beep," *CNNMoney.com, Media Biz*.

"Leave your text message after the beep . . . ," FT.com *Financial Times*. (2007).

Lee, Maggie (2006) "Not all talk: A strong coffee with the founders of speech-to-text telecom *Spinvox*," *European Business*.

Office Action for U.S. Appl. No. 11/971,097, mailed Mar. 29, 2011.
Office Action for U.S. Appl. No. 12/113,733, mailed Dec. 10, 2010.
Office Action for U.S. Appl. No. 12/125,746, mailed May 16, 2011.
Shannon, Victoria (2007) "The End User: A voice for the consumer, Speaking up to get online," *International Herald Tribune*, Web Site: http://www.iht.com.

Wides, Cara, "A new spin on messaging," *Spotlight*, Fonel, 2007.

\* cited by examiner

FIG. 3

METHODS AND SYSTEMS FOR MANAGING TELECOMMUNICATIONS AND FOR TRANSLATING VOICE MESSAGES TO TEXT MESSAGES

CROSS-REFERENCE TO RELATED APPLICATIONS

This is a continuation of U.S. patent application Ser. No. 14/221,178, filed Mar. 20, 2014, which is a continuation of U.S. patent application Ser. No. 13/898,001, filed May 20, 2013, now U.S. Pat. No. 8,688,092, which is a continuation of U.S. patent application Ser. No. 12/046,305, filed Mar. 11, 2008, now U.S. Pat. No. 8,447,285, which claims priority from U.S. Patent Application No. 60/908,169, filed Mar. 26, 2007; U.S. Patent Application No. 60/914,172, filed Apr. 26, 2007; U.S. Patent Application No. 60/944,243, filed Jun. 15, 2007; U.S. Patent Application No. 60/948,413, filed Jul. 6, 2007; and U.S. Patent Application No. 60/975,492, filed Sep. 26, 2007, the contents of which are incorporated herein in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telecommunications, and in particular, to methods and systems for retaining, organizing, presenting, and responding to calls and messages.

2. Description of the Related Art

Conventionally, subscribers of voice mail systems can access voice messages that have been left for them by calling a phone number and listening to their messages. More recently, subscribers have been provided the option to access and listen to their voice messages from a network-based computer. In addition, there have been recent improvements in the ability of call processing systems to translate audio into natural-language text.

SUMMARY OF THE INVENTION

The present invention is related to telecommunications. Example embodiments described herein process voice messages so as to convert the voice message to text. Optionally, certain portions of a message are transmitted in a communication to an intended recipient (e.g., a called party), while other portions are not included in the communication. By way of example and not limitation, the communication can be a text message (e.g., in the form of an SMS message or an email message) or a multimedia message (e.g., an MMS message or a rich text/HTML email).

An example embodiment provides a method of converting a voice communication received over a telecommunication network to text, comprising: receiving at a call processing system coupled to a telecommunications network a call from a caller intended for a first party, wherein the call is associated with call signaling information; storing at least a portion of the call signaling information in a computer readable medium; playing a greeting to the caller; receiving and recording a voice communication from the caller; converting at least a portion of the voice communication to text; analyzing the text to identify portions that are inferred to be relatively more important to communicate to the first party; generating a text communication including at least some of the identified portions and including less words than the recorded voice communication; and making at least a portion of the text communication available to the first party over a data network.

An example embodiment provides a method of processing a voice communication, comprising: receiving at a call processing system a call from a caller intended for a first party; converting at least a portion of a voice communication intended for a first party to a first version of text; applying at least one rule to the first version of text to make a more concise version of the first version of text; and making at least a portion of the concise version of the text available to the first party.

An example embodiment provides a method of processing a voice communication, comprising: converting at least a portion of a first voice communication received over a communication network to a first text version, wherein the voice communication is intended for a first party; generating a more concise text version as compared to the first text version, the concise text version corresponding to one or more portions of the first voice communication; and enabling access to at least a portion of the more concise version by the first party via a data network.

An example embodiment provides a method of summarizing a voice communication, comprising: receiving at a call processing system a call from a caller intended for a first party, wherein the call is associated with call signaling information; storing at least a portion of the call signaling information associated with the call in a computer readable medium; converting at least a portion of a caller voice communication intended for a first party to text; applying a set of rules to the text to make a more concise version of the text; and making at least a portion of the more concise version of the text available to the first party over a data network.

An example embodiment provides a method of summarizing a voice communication, comprising: receiving at a call processing system a call from a caller intended for a first party; receiving call signaling information associated with the call; storing at least a portion of the call signaling information associated with the call in a computer readable medium; playing a greeting to the caller; receiving a voice communication intended for the first party from the caller; recording the voice communication; converting at least a portion of the voice communication to text; transmitting in substantially real time from the call processing system at least a first portion of the voice communication to a terminal associated with the first person; applying a set of rules to the text to make the text more concise; and making at least a portion of the more concise text available to the first party.

An example embodiment provides a method of processing a voice communication, comprising: analyzing content of at least a portion of a first voice communication from a caller received over a communication network to identify gist content in the first voice communication, wherein the first voice communication is intended for a first party and includes a plurality of spoken words; generating a first text version of at least a portion of the identified gist content, wherein the text version includes less than all of the words in the first voice communication; and enabling access to at least a portion of the first text version by the first party via a data network.

An example embodiment provides a method of processing a voice communication, comprising: receiving via a voice mail system a voice communication from a caller intended for a first party, the voice communication including a plurality of words; identifying what communication channel is to be used to transmit a text version of the voice communication to the first party; and generating a first text version of the voice communication, wherein the first text version is of a size suitable to be transmitted via the identified communication channel, wherein the first text version does not include all of the voice communication words, includes abbreviations of a voice communication word, and/or includes an intentionally misspelled word, wherein the intentionally misspelled word includes less characters than if the misspelled word was spelled correctly.

An example embodiment provides a method of processing a voice communication, comprising: receiving a voice communication including a plurality of spoken words from a user; converting some or all of the voice communication to text; and automatically selectively posting one or more portions of the text on a web page associated with the user, wherein text corresponding to a portion of the plurality of spoken words is not posted.

An example embodiment provides a method of processing a voice communication, comprising: receiving a voice communication including a plurality of spoken words from a first user; converting some or all of the voice communication to text; automatically causing at least in part some or all of the text to be displayed on a web page associated with the first user, wherein the web page is accessible by at least a second user; and automatically transmitting some or all of the text to one or more other destinations designated by the first user.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 3 illustrates a second example Web-based telecommunications client call log and user contact interface.

DETAILED DESCRIPTION OF PREFERRED EMBODIMENTS

Figure 1:
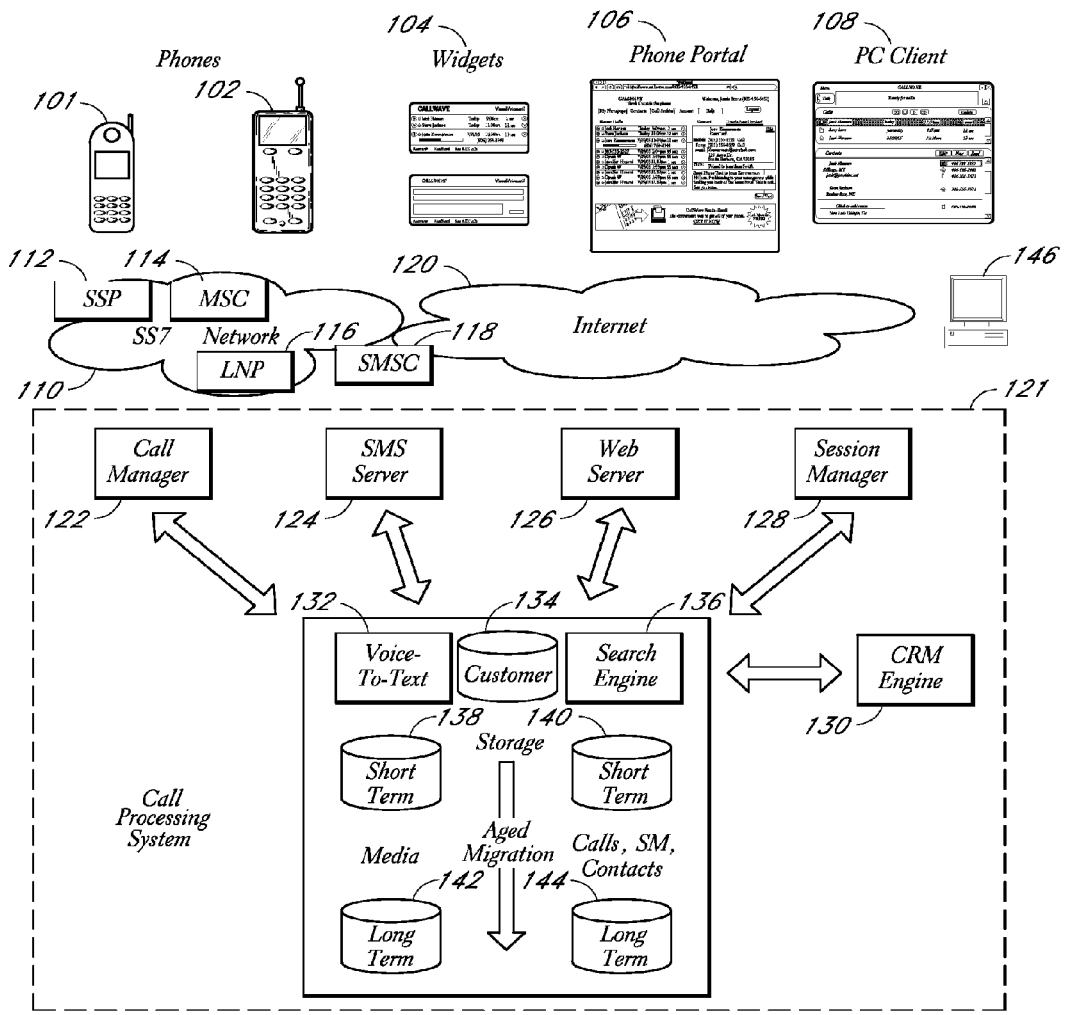
FIG. 1 illustrates an example network operating environment for advanced telecommunications services.

The present invention is related to telecommunications, and in particular, to methods and systems for retaining, organizing, presenting, and responding to communications, such as calls, messages, and/or other objects. In addition, example systems and methods are described for determining a text representation of a voice message, such as, by way of example, the "Gist" of the message.

Methods used to listen to and retrieve voice messages left for a subscriber have evolved over the last several years. Conventionally, a subscriber's access was limited to retrieving voice messages by calling a pilot number or their own number and optionally entering a password. Once logged into the voice mail system, the subscriber could listen to each message sequentially. With the proliferation of personal computers and smart phones, more services are being offered whereby a subscriber can access a visual list of their voice messages and listen to a specific message on their computer (e.g., through a headset or speakers connected to their computer) or smart phone. This visual user interface simplifies a subscriber's experience because it lets subscriber's manage their voice messages like their electronic mail.

Certain methods and systems descried herein provide for the conversion of a voice message audio signal into natural-language text in the context of a call processing system. The text may be a complete transcription of the message, or, the text may additionally or only correspond to a portion of the message (e.g., the "gist" of the voice mail message). The term "e.g.", as used herein, is intended to be used to introduce non-limiting examples. Optionally, where both a complete transcription version and a partial/gist transcription version are being provided, the two versions can be included in the same communication to a recipient, or can be included in two separate communications and/or files, optionally with an appropriate notice (e.g., file name, subject field text, etc., indicating whether a complete or gist version of the transcription is being provided).

Conveying the "Gist" of a message to a subscriber optionally includes but is not limited to prioritizing certain important, semantically rich, or otherwise significant aspects of the content of a message. For example, the "Gist" of a message can be used to assist the subscriber with an answer to certain questions. Example questions that can be responded to by providing message gist can include some or all of the following (and/or other questions):

"What is the message about?"
"What (if anything) do I need to do?"
"With what priority do I need to act?"
"Who is the message from?"
"Do I need to call back?"

Conveying the gist of a message has certain advantages for the subscriber as compared to providing or only providing the entire text of a message. The subscriber may not have to read the entire message in order to understand the message substance. In addition, the gist of a message can be presented in limited display call logs (e.g., in a Web 2.0 Desktop Widget or in the subject line of an electronic mail software client, or on a relatively small display of a handheld mobile phone) and/or transmitted via Short Message services to personal computers and wireless handsets, while still communicating valuable information. Additionally, the gist of a message can optionally be delivered in a more timely manner than a complete transcription of the entire message, requires less network bandwidth to transmit, and occupies less memory on the receiving device (which may be especially advantageous when the receiving device has a relatively small amount of memory, as may be the case with certain handheld mobile phones).

Retaining, organizing, and/or transcribing calls and messages improve subscriber's overall communication experience, increasing the attractiveness and value to the subscriber of the service provider's telecommunications service offering. Further, because some or all of this secure personalized information may not be available to another service provider (e.g., because the information is stored on a server controlled by or as associated with the subscriber's present provider), such retention, and/or transcribing calls can act as a subscriber retention tool for a service provider as the subscriber would not want to lose access to the personalized information. In an example embodiment, a security and information usage policy associated with the system is clearly communicated to the user at the outset to establish trust.

In addition, embodiments of the present invention provide methods and systems to enable a service provider to offer services that allow subscribers to store a collection of objects (e.g., calls and messages). These objects of interest to the subscriber are optionally accumulated as calls occur and messages are exchanged. The data/objects of interest are organized to be useful and are readily accessible to the subscriber from various devices. The data/objects are retained indefinitely (or for an extended or designated period of time) in a reliable and accessible file store. Given that storage is optionally indefinite, is such circumstances the storage is preferably large and reliable. In an example embodiment, this is achieved with large redundant data farms with geographic separation, using RAID, distributed peer-to-peer redundant data storage and/or other techniques.

In addition, certain example embodiments of the present invention provide methods and systems to enable a service provider to offer services that allow users (e.g., a social networking user who uses a web site, such as the MySpace.com® website, to keep in touch with friends and family), to easily record messages which can be subsequently delivered in a voice or text format to the user's social networking web page, individuals, and associated group distributions (e.g., email, SMS, or MMS groups).

Certain embodiments of the call processing system described herein provide call and message services using condition monitors/triggers, such as SS7 Advanced Intelligent Network (AIN) triggers. In an example embodiment, to support this service, the service provider configures a trigger at the appropriate points in an inbound and/or outbound call for a customer/subscriber. In an example embodiment, when a certain trigger fires, a call processing system (e.g., acting as a Service Control Point (SCP) in the SS7 network, and connecting calls from one phone line to another, using, for example, software running on a computer system), receives a query that enables the call processing system to control, at least in part, the call and optionally control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non-Intelligent Network Signaling (e.g., ISDN, CLASS Call Forwarding services) is used to originate, terminate, forward, and bridge calls.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the following description refers to example network and telephony standards and protocols, other standards and protocols can be used as well. The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well. While certain phone addresses are referenced for purposes of illustration, other electronic addresses or locators can be used as well.

In addition, while references may be made to electronic address books or contact lists, other data stores and formats can be used to store contact information. While certain intelligent network triggers are referred to herein, other triggers or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone (e.g., with an operating system and on which a user can install applications) and so on. While certain references are made to certain example system components or services, other components and services can be used as well and/or the example components can be combined into fewer components and/or divided into further components.

In addition, while certain user inputs are described as being provided via phone key presses or by clicking on a button, optionally, user inputs can be provides using other techniques, such as by voice or otherwise.

While some examples refer to certain example messaging protocols (e.g., SMS or MMS) for illustrative purposes, other messaging protocols can be used as well (e.g., instant messaging, email, etc.).

Figure 2:
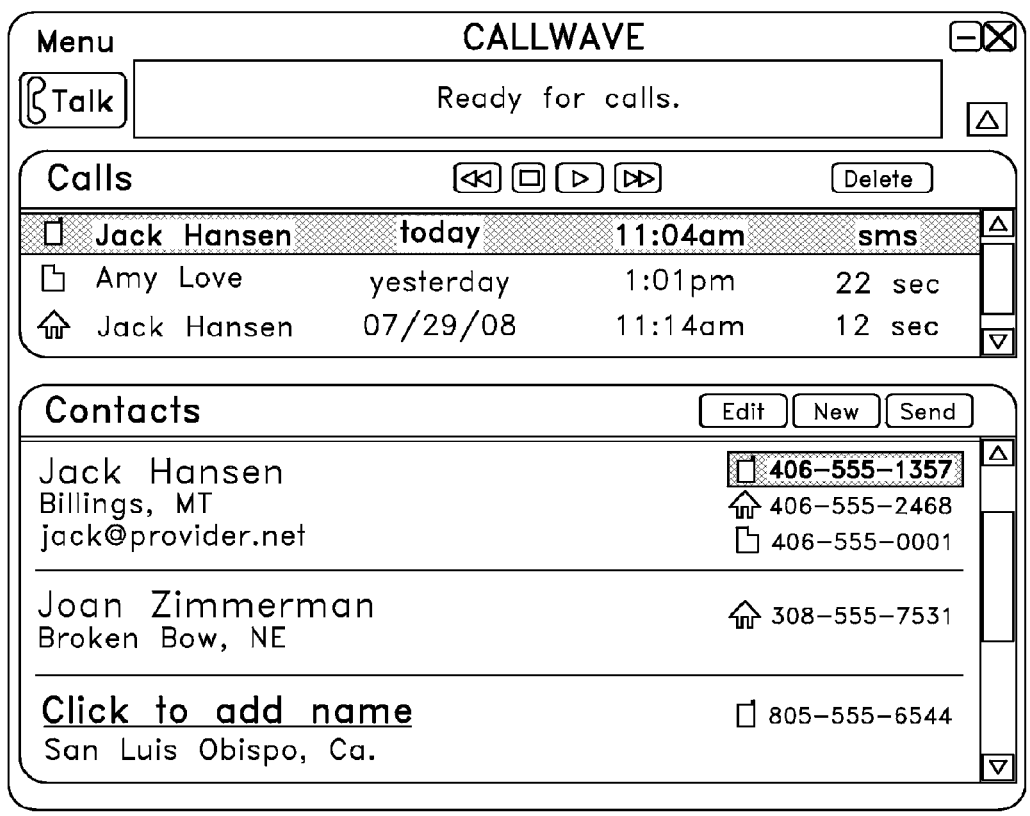
FIG. 2 illustrates a first example telecommunications client call log and user contact interface.
Figure 3:
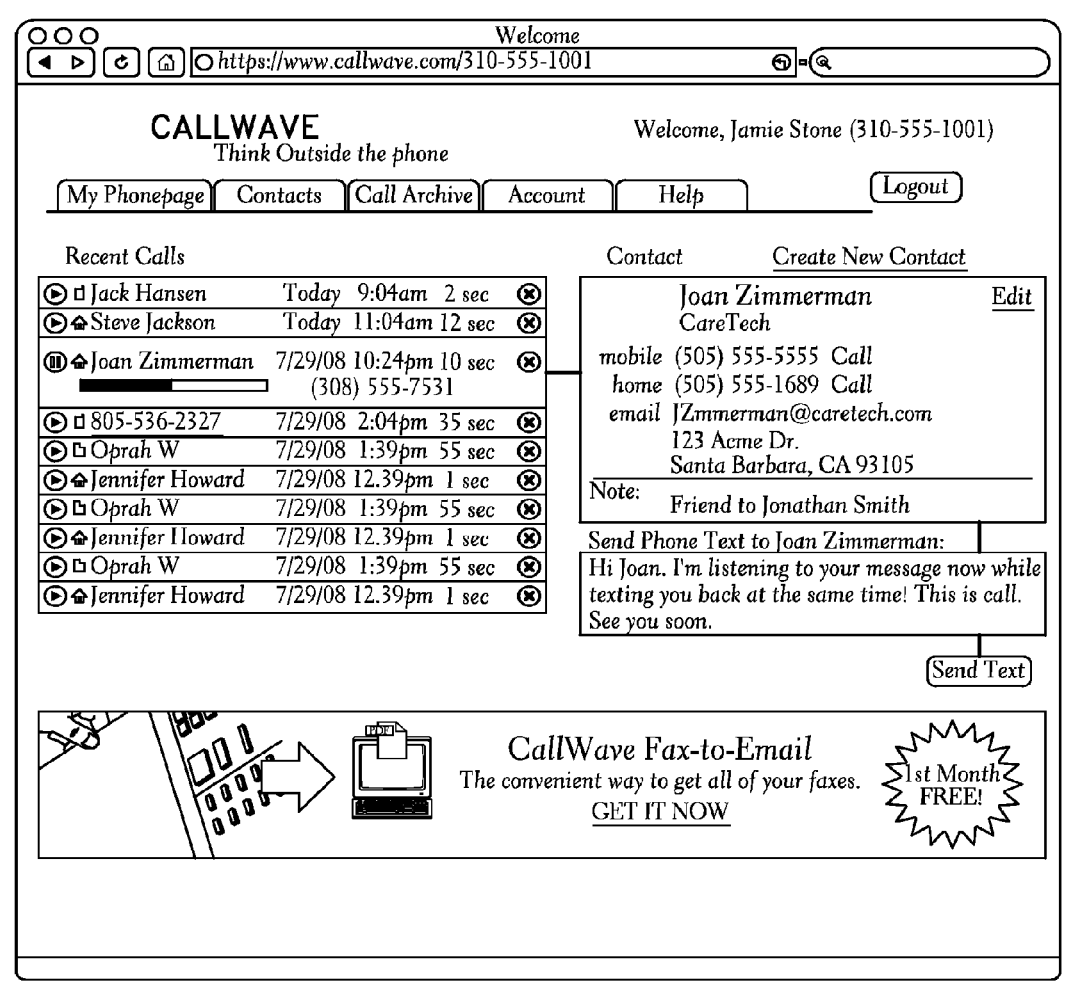
Figure 4:
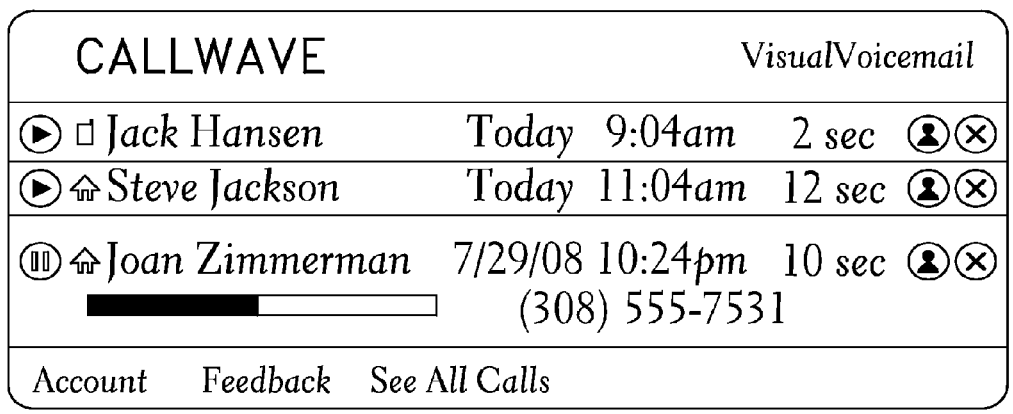
FIG. 4 illustrates a third example Widget-based telecommunications client call log user interface.

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interfaces illustrated in FIGS. 2-4). Optionally, a customer can have multiple clients hosted on multiple computers or other hosts.

In an example embodiment, the telecommunications client application (see, for example, FIG. 2) connects to and communicates with a call processing system via the Internet, an intranet, or other network. The client application, executing on a subscriber's computer terminal or other host, can make the subscriber's online presence known to the call processing system (e.g., by transmitting a message over the Internet to the call processing system). Optionally, the client can be used to receive, edit, and display call log data from the call processing system (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded messages from callers, and optionally can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the call processing system streams a message being left by a caller to the client so that the called party can listen to the message in substantially real time) and to instruct the call processing system to accept calls on the host computer terminal, forward calls, refuse calls, initiate call conferencing, and to otherwise provide call handling instructions. Optionally, the client provides interfaces via which a user can respond to calls using a text reply option and/or a multimedia reply option. In addition, interfaces are optionally provided via which a user can search their contact database and/or the web.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log.

A telecommunications client is just an example user interface. FIG. 3 illustrates another example call log user interface presented via a browser to a customer. The browser can be, by way of example executing on a computer terminal, such as a personal computer, a Wireless Application Protocol (WAP) or browser-enabled phone, a PDA or the like. The call log can be accessed by supplying the appropriate URL to the browser and optionally providing log-on information, such as a user name and a password. The example user interface includes a call log, including, when available, the name/phone address of the caller, the day and time of the call, the length of the call, an indication as to whether a message was left, and controls for playing back recorded message. In addition, if a message is being played back, optionally corresponding transcribed text is displayed in a synchronized manner with the voice message playback. Clicking on a log entry causes a contact record associated with the caller to be presented (e.g., including name, company name, mobile phone number, work phone number, email address, physical address and/or other information). In addition a text field is provided via which the user can enter a text message to be transmitted to the selected log entry recipient.

Some or all of the information and functionality provided by the user interfaces discussed can be provided by a widget or a gadget, such as that illustrated in FIG. 4. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

The functionality, operation, and implementation for an example service retaining, organizing, presenting, and responding to calls, messages, other objects will now be described in further detail.

Glossary
AIN—Advanced Intelligent Network
CP—Carrier Partner
IM—Instant Messaging
IP—Intelligent Peripheral
MMS—Multimedia message service
MSC—Mobile Switching Center
SCP—Service Control Point
SMPP—Short Message Peer-to-Peer Protocol
SMS—Short Message Service
SSP—Service Switching Point
SS7—Signaling System 7
WIN—Wireless Intelligent Network FIG. 1 illustrates an example advanced telecommunications network environment. A service provider or carrier (e.g., a Carrier Partner) customer may have one or more landline phones 100 or wireless phones 102 that connect to a local exchange switch, an SSP 112, or an MSC 114 in the carrier's network 110. The customer may also have one or more hosts (e.g., personal computers, networked televisions, personal digital assistants, smart phone, etc.) running a telecommunications client 108. In addition, a customer may have one or more phones 101 connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP, Skype/peer-to-peer, or other protocol) to a call routing service provider or other destination. One or more caller phones 103 may be used to place call to the subscriber, and the calls may be answered by the call processing system 121.

The telecommunications client 108 (and/or the widget 104 and/or the web-based phone portal 106) has one or more user interfaces that display some or all of the following: a call log, text messages (including transcribed voice messages), a contact record/list, an optional automated character, and active, in-progress calls. The customer can elect to screen or take an active call or respond to a caller with a text message. Optionally, calls can also be made (originated) via the telecommunications client 108 (e.g., where the host is equipped with a speaker and microphone or where the client instructs the call processing system 121 to place and then bridge calls between the subscriber and a called party). Optionally, information about a caller can be retrieved through a search function.

In this example, the call processing system 121 has a number of components, some of which are optionally centralized at a given location, others of which may be co-located in the carrier's network (e.g., to reduce network transport costs). An SCP (Service Control Point) is an optional AIN component that interacts with the SSPs 112 (e.g., using the TCAP (Transaction Capabilities Application Part) protocol). AIN triggers are armed for the customer's landline phone number/address/account so that when calls are made to or from that phone, a trigger fires and causes the SSP 112 to query the SCP for instructions on how to handle the call. The SCP is optionally also configured to perform TCAP queries to other SS7 components as needed by some services (e.g., request Automatic Callback from another carrier's switch when a line becomes idle).

In a non-AIN deployment, the call processing system 121 optionally interconnects with the PSTN using, by way of example, SS7. In this case, in an example embodiment, the SS7 signaling information associated with a call terminates on a Call Controller subsystem or the like, and the trunks (or bearer channels) terminate on one or more call managers (described further below). Optionally instead, the Call Controller subsystem and/or associated functions thereof, are included in the call manager subsystem 122.

In a VoIP deployment scenario, the call processing system 121 interconnects with the PSTN through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet 120.

In an example embodiment, SS7 WIN triggers are set in the mobile switches of wireless carriers (e.g., wireless carrier Partners) to provide similar calling services as described herein with respect to a landline phone for a customer's mobile phone number/address/account.

In an example embodiment, the call processing system 121 also contains one or more systems referred to as call managers 122. The call managers 122 are connected to the PSTN (e.g., via ISDN using the ISUP (ISDN User Part) protocol, by way of example, although other protocols can be used). The call managers 122 provide some or all of the following: provide a call screening service when screening is to be provided, record a message from a caller that is to be recorded, provide a voice prompt or message that is to be played to a caller and/or called party, record a facsimile document, detect speech or DTMF tones, convert speech that needs to be converted to text (e.g., via the voice to text engine 132, which may be located in or external to the call manager 122), and/or provide a gateway between the SS7-based networks (PSTN) and SIP-based networks (VoIP). The example call manager 122 optionally can also act as an IP (Intelligent Peripheral), another AIN component that the SCP can instruct the SSP to connect into the call for interaction with the called and calling party. The IP/call managers 122 and SCPs in the call processing system optionally share a Call Registry that stores information about active calls.

The session managers 128 in the call processing system 121 optionally track telecommunication client presence and interact with a given telecommunications client (e.g., a client application hosted on a personal computer, such as client 108, PDA, smart phone, or a networked television) as call log, contact, and/or customer data needs to be synchronized with the centralized databases to provide the customer, via the client 108, with updated log, contact, and/or customer data. The session managers 128 also optionally provide the SCP in an AIN environment and call manager 122 in a non-AIN environment with service configuration information for the customer involved in a call. During an active call, the SCP and/or IP/call manager 122 optionally directly or indirectly interact with the telecommunications client 108, a phone portal 106, or a widget 104 to provide call progress information, provide message text, and to stream audio and/or visual content.

The call processing system 121 in this example contains centralized databases and/or a general-purpose storage area, optionally including, but not limited to, some or all of the following: a call log database, a contacts database, and a customer database 134. Optionally, the databases are not centralized and may be distributed geographically and/or over different systems. In this example, short term storage 138, 140, and long term storage 142, 144 may include one or more of the foregoing databases. Data stored in the short term storage may be copied or transferred to long term storage 142, 144 after a specified period of time or periodically. The long term storage 142, 144 may include, by way of example, optical storage, magnetic disk drives, and/or tape storage.

The call processing system 121 in this example also contains a subsystem 132 for voice message transcription to natural-language text. For example, the subsystem can perform speech recognition using Hidden Markov Model, dynamic programming approach, neural network, knowledge-based techniques, and/or other techniques. The subsystem includes various control programs and/or devices including some or all of the following and/or additional and/or different programs and/or devices: a control program which submits voice message audio files to an internal or an independent device (e.g., a dedicated device including hardware and/or software) specialized for speech recognition, and receives back a text file that consists of a text transcription of the audio together with a set of values representing timing, probability or confidence values relating to the transcription and other features; a traffic optimization device or program which ensures that voice messages are transcribed, by one or more speech recognizers, efficiently so as to reduce undesirable delays; and a system of gist processing and gist identification devices or programs (referred to herein as a "gist analyzer") which operate on the natural-language text output to produce a "Gist"-type message.

The gist analyzer optionally includes but is not limited to the following:

a. A program or device for controlling the speech recognizer in multiple passes over the input file, varying in the speed and accuracy of its internal computations, so as to derive selected key gist concepts more quickly than a full transcription would require b. A text-based device or program for voice message text normalization c. A text-based device or program for identifying gist content words or phrases in the voice message d. A text-based device or program which, in the case where word identity is relatively uncertain, signals that low certainty to the subscriber e. A computational device or program for identifying gist content from grammar and prosody parameters of the recognizer output f. A device or program for selecting the choice of recognizer engine based upon call-specific and/or caller-specific characteristics g. A device or program for providing feedback to the caller h. A device or program for collecting feedback from the called subscriber, to create personalization of the gist content, and feedback from the subscriber on the perceived quality or performance of the system i. A device or program for expanding the gist of a message into the transcription of the entire message, at the subscriber's option, and/or j. A device or program for passing the audio file with its associated gist and/or full transcription to a human listener for corrections and for improvement of accuracy Example embodiments of gist processing and gist identification devices and/or programs are discussed in greater detail below.

The call processing system 121 optionally includes other subsystems, such as some or all of the following: a router subsystem, which serves as an interface to the Internet 120 to manage communications between online IP client devices and call processing servers, an SMS server subsystem 124 which serves as a mail relay to transmit and receive SMS and MMS messages via an SMSC 118, a search engine 136 which can be used to search and sort archived calls, text and voice messages, contacts, and other kinds of phone related objects, a Customer Relationship Management (CRM) system 130 for monitoring and analyzing usage data and promoting new products and services and for providing related information to a operator terminal 146, a web server subsystem 126 to manage a "web site" associated with the call processing system 121 (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

The kind of objects that optionally can be stored by a service provider is optionally not limited to a particular set of objects. Therefore, the list below includes non-limiting example illustrative objects that people can relate to and make long term use if they are readily accessible but is not meant to be a complete list:

Call—meta data associated with a phone call, such as, by way of example, some or all of the following: time, duration, disposition, caller information (including but not limited to caller ID, caller Name, calling number, privacy restrictions), capture (recording) of the call conversation.

Contact—information about a person with which the user interacts, such as, by way of example, how to reach them (e.g., phone address(es), SMS/MMS addresses, email address(es), instant messaging address(es), and/or other addresses), other personal effects, such as a picture, etc.

Message—voice, fax, or text message that is exchanged and optionally associated metadata and attachments such as pictures, files, music, etc.

Picture—a picture that is taken with the phone or received from others.

Tune—a purchased piece of music with copyright protection.

Ring tone—a ring tone in general use or associated with a particular contact.

Greeting—a personal greeting for general use or associated with a particular contact.

Some of foregoing content can be backed up information corresponding to information that is currently in use and/or stored on the user's phone. Thus, if the user loses their phone or their phone malfunctions and so that information is lost, the information can be restored via the back up. Optionally, the back up data can also be copies onto other terminals associated with the user.

Other content that may be stored is of the kind that accumulates over time and contains items of information that is valuable to reference later, and may be too voluminous or unwieldy to store on the user's phone. The information of interest is accumulated as calls occur and messages are exchanged. The information is optionally also captured as part of routine synchronization with the phone handset via a wireless data connection (e.g., via a carrier network, WiFi, Blue Tooth, etc.) or via temporary wired connection to a computer, such as a personal computer or smart phone. Optionally, certain information is retrieved from SS7 network databases or other databases.

Example areas of interaction where information can be gathered on behalf of the user include:

Voice Mail—When a caller calls a user, the call may be answered by a voice answering system (e.g., on a call forward condition when a user line is busy, on a call forward no answer condition, on a call forward all condition, when the call is placed to a virtual number "owned" by the call processing system and associated with the user, etc). The voice answering system can play a greeting to the caller, asking the caller to record a message, and if the caller leaves a voice message, it is recorded and stored for later access and/or transcription. In addition to the voice message, information regarding the caller, when available, can be captured and stored. For example, some or all of the following caller-related information can be captured: the caller phone address, the caller location, the caller name (e.g., retrieved via a database query using the phone address, such as a query to one or more of a SS7 CNAM database, a Line Information Database (LIDB), a name cache, a contact address book, etc.).

Fax Mail—A facsimile can be received and stored (e.g., by a fax server). For example, the fax can be received in conjunction with a voice mail interaction or by the fax initiator directly dialing a virtual fax number "owned" by the call processing system and associated with the user. As similarly described above, information about the caller may also be accessed/received and stored.

Short Message—Short messages (SMS/MMS) may be exchanged between people via phones and computers (e.g., personal computer), or other SMS capable terminals and stored by the system. The messages may be captured, by way of example, at the SMSC level, and for interactions with a computer, the messages may be captured at the computer. As similarly described above, information about the sender may also be accessed/received and stored. For example, sender information may include the sender phone address or an email address. Instant messaging chat interaction can also be tracked and stored, and information regarding the chatters can likewise be stored.

Phone Call—Information about inbound or outbound calls that do not result in a busy or no answer condition may be captured by intercepting the call (e.g., using AIN or WIN triggers). Such interception is non-intrusive, yet can provide full or partial information related to the call including phone information about the other party (e.g., the caller or called party phone address, city/state, etc.), disposition of the call, and/or call duration. The triggers can also be used to establish a call leg by which the conversation can be conferenced with a call processing system and recorded if so desired.

Handset Synchronization—Synchronization software may be deployed on a telephonic handset whereby data on the handset may be synchronized with the server (e.g., where data on the handset is copied and/or used to update data stored on the call processing system, and/or where data stored on the call processing system is copied and/or used to update data stored on the handset. The synchronization may be originated by the handset or optionally by the server. Optionally, synchronization may be configured to occur automatically when a relevant change is detected on the handset or when the handset is notified of a change in the data archive that originated from other sources. Optionally such synchronization may be restricted to occur only when in higher bandwidth settings, e.g., WiFi, 3G, etc. Synchronization may be optionally invoked manually by the user. The data synchronized may optionally include some or all of the following: contacts, pictures, tunes, ring tones, music, movies, configuration information, email, text messages, instant messages, etc.

Web or Computer Interfaces—The data that is archived may be optionally augmented from other sources (e.g., Outlook (or other personal information manger) synchronization of contacts, or the data may optionally be directly altered by the user through Web and computer interfaces). The Web/computer interface is considered an extension of the handset in that, optionally, it can make direct use of the stored information and generate information that is stored there as a result of the user generating calls or messages from that device.

As discussed above, some of the information that is gathered directly is augmented with other related data. This optionally includes name information from the SS7 CNAM database and the current carrier owning a number from the SS7 LNP database. The information optionally also includes address information (e.g., from an SS7 LIDB database). This information is optionally used to automatically populate (in whole or in part) contact records associated with a user contact data store to form another type of information that is captured.

The captured/stored data is organized to be useful and is made readily accessible to join various pieces of information of interest, (e.g., based on time, personal contact, thread of interaction, or search text). Some or all of the following techniques are optionally used to help organize the data and make it more accessible:

Voice-To-Text—Voice messages and conversations are converted to text optionally using large vocabulary continuous speech recognition technology, by individuals transcribing speech, by individuals speaking clearly into speaker dependent or independent speech recognition subsystems, or some combination of the recognition technology and individuals transcribing. Voice-to-text conversion can be performed as part of initial message presentation and/or at a later time during archiving.

Optionally, the voice-to-text process is configured (e.g., by a system operator, a subscriber, or other authorized person) to be restricted to performing keyword spotting, for example to spot words specified in a keyword file defined by a subscriber and/or a system operator, which may, by way of example and limitation, include proper/family names (e.g., John, Jane, Mom, Dad, etc.), activity words (movie, lunch, dinner, gym, walk, etc.), and/or words indicating urgency (e.g., "as soon as possible", "ASAP", "immediately", "when you get a chance", "no hurry", "no rush", etc.).

Optionally, the voice-to-text process is configured (e.g., by a system operator, a subscriber, or other authorized person) to be restricted to convert only the lead-in of the voice communication to text (e.g., the first specified number of words (the first 10, 20, or 30 words), the words in a first time period (e.g., the first 5 seconds, 10 seconds, 15 seconds), or to convert the entire message.

Conversion to text facilitates search and storage. Optionally, the text is indexed (e.g., using an inverted index, a forward index, or other index, optionally using compression to reduce the size of indices), wherein the searchable index is searched in response to a query to speed search performance.

Optical Character Recognition (OCR)—OCR (software that translates text images into computer readable text) may be applied to fax messages to facilitate search and to make these messages more usable and optionally editable.

Object/Face Recognition—Pictures may be analyzed to recognize objects and faces (e.g., using eigenface, fisherface, the Hidden Markov model, Dynamic Link Matching or other technique), to assign names to the pictures, and to thus allow pictures to be categorized (e.g., by the system and or the subscriber) and made keyword searchable.

Interaction Threads—Associations that can be made to relate a sequence of interactions (e.g., as specified by a system operator or subscriber) are optionally tracked for future reference. In some cases this may be via directly supplied subject information or specific IM chat, email, or SMS sequences. Optionally, the information is inferred based on times, parties involved, and the actual or converted text involved. For example, the messages may be organized and displayed in a conversational manner (e.g., in threaded conversations, such as, by way of example, where all replies to a communication are grouped into a single thread rather than sequentially displayed with other messages based upon time of arrival into the inbox).

In an example embodiment, the collected data is organized around the objects discussed above. Data that has associated text can be searched using a text search. Certain types of data are organized into lists that are naturally indexed (e.g., by phone address, email address, other address, caller/initiator name, called party/recipient name, etc.) and optionally these keys (e.g., address, name, etc.) are used to locate and access the desired data.

Optionally, all or a specified subset of information that is captured is stored indefinitely, until the user decides to delete it, or for a time period specified by the user and/or the system. Optionally, even if a subscriber specifies that certain information is to be deleted, the system may still archive such data for a period of time or indefinitely, but will "hide" such data from the subscriber presentation. Thus, for example, if a user conducts a search, such hidden data will not be presented to the user in the search results, even though it may match the user's query. Optionally, the user can request and be provided with access to such hidden data. Optionally, a user interface is provided via which the user can specify that certain data is to be hidden, rather than deleted.

Optionally, by default, the information is only permitted to be accessed by the user, but the user may optionally establish groups that are allowed to have access to specific information or to certain categories of information (e.g., the user's contacts or a specified subset thereof, the user's outgoing pictures, received pictures, and/or a subset thereof, the user's voice mail messages, or a subset thereof (e.g., those from certain specified callers)). The user may define the group using a corresponding user interface.

For example, a user may activate a create group control, name the created group, and then in effect drag the shared information into that group (e.g., "dropping" the information onto a displayed group name or into a displayed group file). Optionally, some information is explicitly and optionally automatically designated or identified as private and may not be shared (e.g., some or all of copyrighted information, such as music, movies, etc.). Information about a caller that is marked restricted in the network (e.g., the caller phone address when the caller has Caller ID blocking) is optionally not shared with the user but the user may tag information received from that person with their name once they know it.

The archived/stored information is optionally made to be accessible from various devices including optionally a computer, a handset in voice mode or data mode, a networked television, or other device. The access method may be specific to a particular kind of information (e.g., a list of most recent calls, a list of contacts, or the text from a converted voice message to be sent in an SMS) or it may be very general (e.g., search for all interactions with a particular individual in a given timeframe that involved a particular subject). Thus the stored information can be accessed to present to a user new, recently arrived information, and/or older information (located by searching back through relatively older data).

The user interfaces for access to the stored/archived information are optionally device specific. Thus, by way of example and not limitation, the user interface for a computer may be provided via a Web 2.0 widget, a more traditional Web portal, and/or an executable client. For a handset, the interaction is optionally tailored to the available display space and interaction mechanism, where the functionality is similar although optionally reduced in scope. For example, for a handset, certain logos, menus, images, and the like can be reduced in relative size or eliminated. FIGS. 2-4, discussed above, illustrate example embodiments of various user interfaces that can be used on various terminals.

Additional example processes for utilizing stored/archived information will now be described.

Data synchronization is optionally provided which enables data (such as some or all of the data discussed above) from an archive to be accessed and/or utilized by a remote handset. For example, if user needs to search for contacts beyond the manageable number of contacts the handset can manage (e.g., wherein not all the contacts are stored on the handset), the system automatically reaches back into the archive stored remote from the handset to locate contacts stored in the archive based on user search terms or index selection (e.g., contacts beginning with the letter "A"). A user can similarly access archived call logs, message text, etc.

Optionally, a text reply or call back to an caller/initiator placed via a call log entry corresponding to a communication from the caller/initiator automatically causes one or more databases (e.g., SS7 databases) to be queried if call log entry is older than a certain date. By way of example, if a call log entry or response to a search query is older than a year, the system may be configured to automatically query a database (e.g., an LNP database) to determine if the number has been ported to another carrier or has been provisioned to another user.

Usage information can be accumulated that can then be provided to the Customer Relationship Management (CRM) engine. The CRM engine can utilize such information to take appropriate action with respect to a user (e.g., a subscriber) associated with the usage information. For example, some or all of the following information can be obtained, stored, and used to determine what telecommunication services one or more participants might be interested in:
  who a subscriber has been calling;
  who has called the subscriber;
  how many people the subscriber has called;
  how many long distances calls the subscriber has placed;
  how many video calls the subscriber has placed/received;
  how many calls have been to/from other subscribers of the carrier;
  the duration of local and/or long distance calls;
  the timing of calls (e.g., how many during prime hours, how many during non-peak hours/on weekends);
  how many text message (e.g., SMS messages), multimedia messages (e.g., MMS messages) and/or photographs/videos the subscriber has sent and/or received;
  etc.

As discussed above, certain embodiments provide for the conversion of voice to text (also referred to herein as "voice text" or "voice message text"), which can be stored and search. The initial conversion may provide the voice text in an unpunctuated form, with the characters in a single case (e.g., all upper case), and the words spelled out in full (as opposed to being abbreviated). In an example embodiment, a transcriber, such as device (e.g., with dedicated or purpose specific hardware, and optionally including software), or program, takes as input an unpunctuated, voice message text (e.g., all in upper or lower case) with words spelled out in full (a conventional output from a speech recognizer), and generates an one or more outputs optimized or enhanced for readability, brevity, style, and/or searching ability, and with context-sensitive ambiguities resolved where possible.

One or more dictionaries or vocabulary data stores are optionally provided that include a database of words, numbers, characters, phrases or the like (such as those discussed below) that are to be translated into more appropriate or readable alphanumeric text (such as discussed below). Optionally, the dictionarie(s) are used in conjunction with one or more rules/analysis tools (such as those described herein) that further analyze the context of the text in deciding if and how a translation is to be performed. Optionally, some or all of the dictionaries may be customized/edited by or for a user/subscriber to add or delete words and phrases. Example components of the transcriber (including a word/sound recognizer engine) perform some or all of the following processes:

1. Text separation into sentences, clauses, or phrases. This component optionally inserts certain elements, such as by way of example, some or all of the following as appropriate (and/or other elements): space, ellipsis ( . . . ) and punctuation marks such as comma, dash, period, question mark, or exclamation point, using evidence (from which it can be inferred which element is to be used), such as, by way of example and not limitation, some or all of the following:

a. Silences in the acoustic signal long enough to represent a pause (e.g., which could indicate that a period, question mark, or exclamation point is to be inserted);

b. Voice intonation patterns, pitch (or change in pitch), inflection, volume (or change in volume), when available For example, the system is optionally configured to mark or emphasize (e.g., by bolding, underlining, placing an emphasis character, such as an exclamation mark before the word/phrase, or otherwise) certain words or phrases based on the user intonation patterns (e.g., a sudden increase in volume, pitch change, pauses, etc.).

c. Clause-initial conjunctions such as "BUT, IF, SO, WHERE, HOWEVER, ALTHOUGH";

d. Hesitation words such as "UH, UM"; and e. Phrases that are conventional or particularly common in voice messages (such as described below with respect to gist content identification in a voice message) and/or text conversations (e.g., "can you tell me" may indicate a question, and so indicate that a question mark should be inserted at the next pause).

2. Case modification. This component optionally modifies case wherein upper case alphabetic letters are converted to lower case, optionally except: in spelled letters of the alphabet, context-sensitively so as to maintain, for example "be" as opposed to "B"; "I" in derivative words such as "I'M, "I'VE"; in the initial letter of day, month, language, titles, when followed by a proper name (e.g., DR., MS., MR., MRS., PRESIDENT, PROFESSOR, etc.), personal/proper names, and place names; in acronyms such as CEO, VIP, ASAP, RSVP. Optionally, if the text is initially in lower case, the system modifies the letter case to upper case where appropriate (e.g., the first letter in a sentence, the letter "i" when it is not part of a longer character string or when used in derivative words, such as, "i'm", "i've", in acronyms, in the initial letter of day, month, language, titles, and personal/proper names and place names, etc.). When the text normalization is optimized/enhanced for an informal style, such as Instant Messaging, or implying/inferring an input mode where case shift is manually difficult, this component may optionally convert some or all alphabetic characters to lower case, as for example in "i'm having blackberry problems here fri so i can't read brian's msg". Optionally, the text normalization style (e.g., normal, informal, etc.) can be specified by the subscriber and/or can be automatically selected based on how the text is to be transmitted (e.g., via IM, email, etc.) and/or the destination terminal type/display screen size (e.g., a mobile phone, a desktop computer, an interactive television, etc.), wherein different terminal types are associated with a particular style.

3. Number resolution:

a. Cardinal and ordinal numbers are converted to digit strings, (e.g., "TWENTY TWO" as "22", FOURTEENTH" as "14th");

b. Telephone numbers, which are a common occurrence in voice messages, are re-formatted to look like phone numbers, with spaces, parentheses and/or dashes as is typical in the United States, (e.g. As "(310) 555-1212") or using other formatting as appropriate to local telephone number formatting conventions; and c. Numbers in conjunction with currency names, with use of currency symbol and inversion of order as appropriate, e.g., TWENTY ONE DOLLARS is converted to $21.

4. Email address resolution. Email addresses are formatted to look like email addresses (for example, john doe at john jane doe dot com is formatted as johndoe @ johnjanedoe.com)

5. Abbreviations. Many speech recognizers generate output in unabbreviated form. Such unabbreviated conversions are optionally translated into common abbreviations. For example, some or all of the following conversions may be performed: "MISTER" is converted to "Mr."; MISSES to "Mrs."; DOCTOR [followed by a proper name] to Dr. [followed by the proper name]; "ETCETERA" to "etc."; "MONDAY" to "Mon."; "January" to "Jan.", etc.). Use of abbreviations may vary according to the purpose of the output (e.g., for informal, short messaging, for searchability, etc.).

Optionally, the conversions to abbreviations may be selectively performed to enhance searching. For example, certain words that could be abbreviated may be left in the unabbreviated form if a user is more likely to use the unabbreviated form when performing a search. By way of illustration, when optimizing for searching ability, "Mr." may still be appropriate since it is the likely form of the search term, but "Mon." less so.

As a further example, when optimizing for an Instant Messaging or other informal style, many more abbreviations may be appropriate as in "enuf mtgs w/ wrk ppl, miss my gf" for "ENOUGH MEETINGS WITH WORK PEOPLE, MISS MY GIRLFRIEND". Thus, the component optionally selects which words are to be abbreviated based on the text normalization style being used. This component may further examine not only single words but entire phrases as candidates for abbreviation, as for example "asap", "ilu", "omg", "ttys" for "AS SOON AS POSSIBLE", "I LOVE YOU", "OH MY GOD/GOODNESS", "TALK TO YOU SOON."

6. Re-spellings and use of non-alphabetic characters. In a style where brevity is important or advantageous, and informality is acceptable, such as in Instant Messaging, the component may use further techniques which optionally save characters and/or suggest community membership. Some of the respellings may not be considered proper spellings, but may nonetheless understandable or common informal spellings. As an example, re-spellings may be used such as "thru", "nite", "u", "c", "b" for "THROUGH", "NITE", "YOU" 'SEE", "BE". As a further example, non-alphabetic character replacements may be used such as "b4", "gr8", "@", "c%1" for "BEFORE", "GREAT", "AT", "COOL". The use of re-spellings and use of non-alphabetic characters are optionally selected based at least in part on the style being used.

7. Resolution of ambiguities.

a. The use of context in a voice message allows for resolving various ambiguities. For example, in choosing between the words "BY"/"BYE", if the use of the word is at the end of the message, the context indicates that the word is to be resolved as "Bye", if it occurs in the middle of a message, the word may be resolved as "BY"; the word "NO/KNOW" may be resolved as "NO" in a variety of message contexts, such as if the word occurs towards the beginning of the message (e.g., message-initial), or after a pause (post-pausal).

Example components of this device or program perform some or all the functions described below. In an example embodiment, underlying these components, which perform gist analysis, is a statistical model of what segments of a voice message are most likely or are more likely to contain gist content. Furthermore, the example model prioritizes among gist content types. By way of example, gist segments that convey urgency, expectation of a reply, a call to action, named entities, and dates and times may be provided with higher priorities than other text. Segments that are of low information may be provided with lower priorities than other text, and optionally not retained further. A data store (such as the dictionaries/vocabularies) can include prioritization assignments for different words and phrases. An example embodiment utilizes a model based on empirical studies of the location of gist within a large corpus of voice messages ("the corpus") and/or intuition, by way of example. A vocabulary of words or phrases that constitute or distill the gist is termed a "gist vocabulary." An example gist identification analyzer performs some or all of the following and/or additional processes.

1. Analyzing message length, and utilizing a statistical model indicating what segments of a voice message most likely contain gist content and the type of gist content that may be expected in a given segment. By way of illustration, an example model indicates that phrases such as "CALL ME BACK" and telephone numbers are commonly found in the last 10 seconds of a voice message. Other gist content, however, tends to concentrate in the first half of a message. Thus, the identification process may analyze the last portion of a message (e.g., the last 5, 10, or 15 seconds) to determine if a call back number was left, and may analyze the first portion of the message (e.g., the first 5, 10, or 15 seconds) to locate a caller identifier (e.g., a proper name or title, such as "mom", "dad", "sister", etc.). Thus, when there is uncertainty as to what the caller is saying with respect to one or more words, the probability as to what is actually being said, and so how to transcribe the word(s), may be affected by the location of the spoke word(s) within the voice communication.

2. Identifying gist from a vocabulary of key gist words in voice messages (which may indicate the subject matter of the message). This gist vocabulary contains words such as: AGREEMENT, MEETING, APPOINTMENT, MOM, DAD, BABY, FAMILY, CALENDAR, CHURCH, CONFERENCE, MOVIE, DINNER, LUNCH, BREAKFAST, SHOPPING, CONTACT, ORDER etc.

3. Identifying gist from a vocabulary of lead-in phrases which signal upcoming gist content in the next few words of a voice message. This gist vocabulary includes phrases such as: "CALLING ABOUT . . . "; "CALLING TO SEE IF . . . "; "CHECK OUT . . . "; "CONVERSATION ABOUT . . . "; "DON'T FORGET TO . . . "; "VERY . . . "; "HAVE YOU HEARD BACK FROM . . . ;" etc.

4. Identifying gist from a vocabulary of phrases commonly signifying actions to be taken upon receipt of a voice message, or important information in a voice message. This gist vocabulary includes phrases such as: "GIVE ME A CALL, PLEASE CALL ME BACK, CHECK YOUR E-MAIL, SENT YOU A FAX, I LOVE YOU, THINGS I NEED, DON'T FORGET, REMEMBER TO, DID YOU", as well as items such as telephone numbers, days of the week, times of day, time adverbs such as "THIS MORNING" or "TOMORROW", numbers with following content words (e.g., dollars, bucks, points, degrees, o'clock) such as "TWO MILLION BUCKS", personal names, and/or place names.

5. Identifying gist from a vocabulary of words that are specialized or uncommon in voice messages, together with a high confidence value for that word as returned by the recognizer. The high confidence value helps ensure that a low-frequency word is not flagged as gist unless the system is sure of it. This gist vocabulary includes words such as: STAMPS, PROXY, SOCKS/SOX, OFFSHORE, SKIING, etc.

6. Analysis of the salutation segment that normally begins a voice message. For example, salutation segments are often very predictable in structure, as summarized in the following table, showing a common syntactic pattern of up to five message-initial elements, some of which can commonly be empty (as in "Hi, it's me."). In this example, the initial elements include "greeting", "recipient", "subject+copula", "caller's first name", "caller second/last name." Only models can include additional, fewer, or different elements.

| GREETING | RECIPIENT | SUBJECT + COPULA | CALLER'S FIRST NAME | CALLER'S SECOND NAME |
| --- | --- | --- | --- | --- |
| Hey | Karen | it's | John | Doe |
| Hi | Mom | this is | Dad | |
| Hello | dude | | | |
| Good morning | | | | |

The gist analyzer may optionally make use of this predictability to vote preferentially, for example, for a personal name as the best candidate word in such a position, rather than another word that may also appear to be applicable. Thus, when there is uncertainty as to what the caller is saying with respect to one or more words, the probability as to what is actually being said, and so how to transcribe the word(s), may be affected by the preceding and/or succeeding words in the communication.

The output of this analysis can be optionally combined with methods that are call-specific or caller-specific as is described in section [Call-Specific and Caller-Specific Characteristics Associated with Gist] paragraph c below, in order to determine gist in a particular instance. For example, if the call signaling information indicates that the call is from a phone address associated with "John" (e.g. by looking up the name associated with the caller phone address in the called party's contact database or other database), then, if there is uncertainty as to what the spoken word is after the sequence of greeting, recipient name, and subject+copula, the analysis process may infer that the word is likely to be the caller's first name (John in this example). Other types of information that may be used to weight the probability as to the meaning of a word may relate to call frequency to and/or from a person with respect to the subscriber.

7. Identifying gist, and prioritizing it relatively highly in this case, from a vocabulary of "red flag" words in voice messages. These are words whose meaning is sufficiently important that a recipient subscriber would likely want to be alerted by them, irrespective of context or other gist content (or providing less weight to such context and other gist content in prioritizing the words), such as for example ACCIDENT, CONGRATULATIONS, CRITICAL, NEGATIVE, URGENT, ASAP, CANCELLED, PASSED AWAY, HOSPITAL, CONFIDENTIAL. Such words or phrases can be identified with a high priority assignment or otherwise by the subscriber, system operator, or other authorized entity in a red flag dictionary or other location.

8. Identifying gist, and prioritizing it relatively highly in this case, from a vocabulary of "urgency marker" words and phrases in voice messages. These are words or phrases which indicate to a subscriber how urgently or non-urgently they need to act, such as for example WITHIN AN HOUR, WHEN YOU GET A MINUTE, ASAP, ALREADY CALLED, NO HURRY, RUNNING LATE, I AM STUCK. Such words or phrases can be identified with a high priority assignment or otherwise by the subscriber, system operator, or other authorized entity in an "urgency marker" dictionary or other location.

9. Identifying as a non-gist segment, and assigning a relatively low priority in this case, phrases that are for example, repetitions of a gist segment, or of a telephone number, phrases that are rambling or vague, such as for example LIKE I WAS SAYING, SO THAT'S ABOUT IT, BLAH BLAH, KINDA, or if appropriate phrases that convey courtesy such as HAVE A GREAT DAY, TALK TO YOU SOON. Such vague phrases and/or courtesy phrase are optionally identified with a low priority assignment or otherwise by the subscriber, system operator, or other authorized entity in a dictionary or other location.

10. The system optionally optimizes gist further analyzing the behavior of subscribers when searching their own voicemail archive. The system optionally invites subscribers to search for a term (word or phrase) within the subscriber's voicemail text archive (e.g., via a user interface with a search field). The system may determine that subscribers preferentially search or tend to search on a part or all of words or phrases that represent key content for them in a message. Examples of such key content words or phrases may include "appointment", "hospital", "customer complaint", "$9.95", "401K plan", "Lucent", "case number" etc. The system may regard such words or phrases as pointers to the focal topic or subject of the voice message, which is otherwise a matter that is known to be difficult to determine, and may build a vocabulary of these words or phrases as a preferred way to identify the focal topic or subject of a new message.

Subscribers may also preferentially search or tend to search on other types of content such as part or all of a telephone number, named entity (person, place, etc.), date, time, email address, physical address, or other identifier. While these may or may not be considered by the subscriber to be the focal topic or subject of the message, optionally the system may nevertheless regard them as key information (information that should be included in the message gist). Subscribers may also preferentially search or tend to search on system-provided information that is not in the message text itself, such as the caller's name or calling location (e.g., obtained from or via the calling signaling information, optionally with the use of one or more databases). In the foregoing such cases, the system may track, store, and use the subscribers' search behaviors to identify their search terms as gist or to weight the system's identification of such search terms as gist (e.g., where key words or weighted more heavily in determining gist). Thus, for example, the system may track and store the number of times a user has used a given search word, string, or other search criteria (optionally limited to a specified period of time, such as the last 3 months, 6 months, year, or other period of time).

The system optionally assists the subscriber by marking words in the output whose identification is of low certainty or confidence. Low certainty can result from many sources including an indistinct or unusually rapid speaker, speaking with a strong accent, a low level signal, background noise near the speaker, telephone microphone quality including use of speakerphone, cellular network degradation effect, transmission channel quality including voice over IP, and the encoding of the telephone signal during transmission.

In an example embodiment, low certainty is determined in this system by a series of computations applied to output parameters from the recognizer engine, including, by way of example, and not limitation some or all of the following:

a. confidence value of best word
  b. confidence value difference between 2 or 3 best words
  c. speech signal timeout and recognizer timeout events
  d. speech onset and offset time values, compared to average values In an example embodiment, the marking of low certainty is signaled to the user/subscriber by a variety of textual modifications including, by way of example, and not limitation some or all of the following (and/or other indicators):

a. inserting a qualifier such as "(sounds like)" or "(?)" before the best word candidate
  b. offering two candidate words such as "LADDER/LATTER"
  c. typographical modifications such as italics, graying, bolding, highlighting, etc.

In addition to or instead of identifying gist as described above, gist is optionally identified using grammar and prosody parameters, such as the stress and/or intonation patterns of an utterance. For example, in certain example embodiments of the recognizer engine, additional output parameters are provided which can optionally be used to identify gist in a probabilistic manner. Such parameters optionally include part-of-speech tags and affix markers that the gist analyzer uses to help identify (for example) nouns and verbs as relatively strong gist candidates. Such parameters optionally also include grammar and syntax markers and prosody (intonation) tags that the device uses to help identify the focus of a sentence as a key gist candidate.

Call-specific and caller-specific characteristics are optionally also used in performing gist identification and/or voice recognition. In an example embodiment, a given voice message may have information about the caller and the call associated with it. Gist may optionally be optimized or enhanced by using this information in some or all of the following ways.

a. The system may optionally determine the caller's telephone address using the call signaling information (e.g., caller ID), which may be provided for display to the subscriber/called party (e.g., via an associated call log entry, as similarly described above). If the caller's telephone number recurs in the text of the voice message, the system may remove the included telephone number as being redundant with respect to the caller identification information provided to the subscriber via an associated call log, so as to concentrate other elements of gist in the message displayed to the subscriber.
  b. The system may optionally determine the caller's name (e.g., using the caller phone address to lookup the caller's name in one or more internal and/or external databases)), which may be provided for display to the subscriber/called party (e.g., via an associated call log entry, as similarly described above). If the caller's name recurs in the text of the voice message, the system may remove the included caller name as redundant with respect to the caller identification information provided to the subscriber via an associated call log, so as to concentrate other elements of gist in the message displayed to the subscriber.
  c. The system may optionally determine whether the caller is known to the subscriber, using system-internal data such as the subscriber's existing contact list, or frequency of this caller's messages per week, or pattern of text replies or callbacks by this subscriber (e.g., by comparing the caller phone address obtained via call signaling information with phone addresses stored in the subscriber's contact database). If the caller is known, the system may optionally remove initial salutation words (e.g. "Hi Henry, its Lisa") and optionally closing words, so as to concentrate the gist in the message displayed to the subscriber.
  d. The system may optionally automatically update the callers contact record with a private telephone number visible to the subscriber if the phone number is included in the voice message and the phone number matches the restricted or private number received in the signaling information associated with the call.
  e. The system, having determined who the caller is (e.g., using methods such as described above or using other techniques), may optionally invoke a speaker-specific recognizer engine (e.g., an engine that has been specifically trained to recognize the caller's speech) to produce superior recognition results and hence more reliable gist.
  f. The system, having determined the geographical origin of the call, using information such as the area code of the caller id, may optionally invoke a dialect-specific recognizer engine to produce superior recognition results and hence more reliable gist.

The system optionally optimizes or enhances the gist generation process further by providing instructions or feedback to the caller. Such feedback optionally can include some or all of the following:

a. Playing a prompt to the caller to speak slowly, clearly and (optionally) briefly. Optionally, the prompt is played at least partly in response to the system detecting during recording of the verbal communication that the caller is not speaking clearly (e.g., if the silent gap between words is too small or non-existent, if the speaker is speaking too quietly, etc.) and/or is speaking too fast (e.g., to a degree that will make accurate voice recognition difficult).
  b. Playing back to the caller all or a section of the recorded message for repeat or clarification. For example, the system can analyze all or a portion of the caller's voice communication to determine and identify portions where the confidence level of performing an accurate translation falls below a certain specified level and/or that the system infers a certain level of importance (e.g., based on the segment of the voice communication, such as the first 10 seconds and/or last 10 seconds; and/or based on certain words that were recognized and are considered indicative of relatively high importance). The system can play those identified portions to the caller and request the caller to repeat or restate the identified portions.

c. Playing back to the caller a section of the transcribed message, converted back to audio by means of a text-to-speech device (e.g., a speech synthesizer using concatenative synthesis and/or formant synthesis). The caller is asked whether a word or phrase thus played back corresponds to what the caller said or intended to say. A correction loop may follow, wherein if the caller indicates that the transcription is incorrect, the caller is requested to repeat the portion of the voice communication that was erroneously transcribed, the entire voice communication, or other amount of the voice communication. Optionally, this correction process is repeated up to a specified number of times, until the caller indicates that the transcription (played to the caller via the text-to-speech device) is correct.

d. The system may notify the caller that the message has been received, and the gist transcribed.

e. The system may transmit the transcribed message (e.g., in its entirety or just the gist) to the caller (e.g., via email or otherwise, wherein the destination address is obtained via a contact record associated with the caller or other data store), and may ask the caller to provide any corrections (e.g., textually in a reply email, or by calling the system and recording a new message).

f. If the system determines that the caller is a frequent caller of the subscriber (e.g., called at least a specified number of times over a specified period of time or since tracking of the caller calls began), the caller may be requested to participate in a speech recognition training session provided by the system so that the system can further improve the speech recognition of the caller's voice messages.

Optimizing Gist by Methods of Feedback to the Called Subscriber

Figure 5:
FIG. 5 illustrates an example Widget-based telecommunications client call log user interface with natural-language text translation of the voice message.

The system optionally optimizes or enhances the gist generation process further by providing instructions or feedback to the subscriber. Such feedback optionally can include some or all of the following:

a. Offering the subscriber the ability to personalize a gist vocabulary to their own preferences (e.g., based on their work, family status, hobbies, etc.). For example, a subscriber that is in a restaurant establishment may wish to concentrate the gist vocabulary on terms relating to reservations, meal times, numbers of diners, etc. In such a case, in an example embodiment the system plays a list of gist terms to the subscriber, using a text-to-speech device, offering the opportunity to prioritize or delete gist terms. Thus, in the example above, the subscriber may elect to add work-specific gist terms (e.g., restaurant related terms for someone associated with a restaurant, medical procedure and appointment related terms for someone in the medical profession, law profession and appointment related terms for a lawyer, etc.) Optionally, in addition or instead, the system collects such terms by recording the subscriber speaking them. The system then creates a personalized gist vocabulary for that subscriber.

b. The system optionally collects information from the subscriber on the performance quality of the system (e.g., indicating which words were or were not correctly transcribed, which gist was or was not correcting identified), using that feedback to determine what messages or proportion of messages to route to human transcribers to improve transcription accuracy and/or gist identification. Thus, for example, if a subscriber is relatively unhappy with the performance of the automated transcription process, then the system may route all or a portions of the messages (e.g., those that the system has a relatively low confidence level with respect to the accuracy of a wholly automated transcription) to a human. The human may perform the entire transcription, may check and correct an automated transcription performed by the system, or may transcribe or check the transcription of selected portions where the system has a relatively low confidence that the automated transcription was or can be accurately performed.

c. The system optionally offers a player (e.g., via a client application hosted on a subscriber terminal or accessible via a browser) that includes a display of the transcribed text and enables the subscriber to playback the voice communication (e.g., streamed from the system or downloaded to the subscriber terminal). In an example embodiment, such as that illustrated in FIG. 5, the player enables the subscriber to move the play cursor (e.g., by dragging it) to any point in the text message to begin audibly playing the message at that point. A further click (e.g., on the cursor) stops the audio playback. Optionally, the transcribed text moves in a ticker tape fashion in sync with the audio playback. Thus, the subscriber can scroll through the transcribed text as well as the voice message. In this way the subscriber can quickly review a message and re-review or replay a particular segment of interest.

In addition, the subscriber may query or confirm a suspect word or phrase. The user interface optionally includes a feedback control wherein the subscriber's decision to accept, reject, or rate a given transcription is fed back to the system, which, in certain example embodiments, uses that knowledge to further train the recognizer and/or routes the voice message and transcription to a human for further improvement of the transcription.

When the gist of the message is being presented to the subscriber (rather than a transcription of the entire message), the system optionally assists the subscriber in recognizing readily that the textual presentation is not a literal or full transcription of the voice message, but rather its gist. In an example embodiment, the gist text is displayed as phrases separated by a non-alphabetic symbol not characteristic of continuous text, such as the ~ (tilde) symbol in the following example: "partner program again ~ your PR dept. ~ 10,0000 emails ~ got copy". The symbol can be used to indicate that words are skipped in the transcription. Optionally, in addition or instead, a word or phrase can be used to identify gist and/or skipped portions (e.g., "gist", "skipped", etc.). Such indications, and in particular, the non-alphabetic symbol(s) may optionally form part of the branding of a product that embodies the device (e.g., may be a logo associated with a service provider). Optionally, different colors, fonts, highlighting, or other indicator(s) may be used in addition or instead to indicate which text is a literal or full translation and which text is not a literal or full translation.

Figure 6:
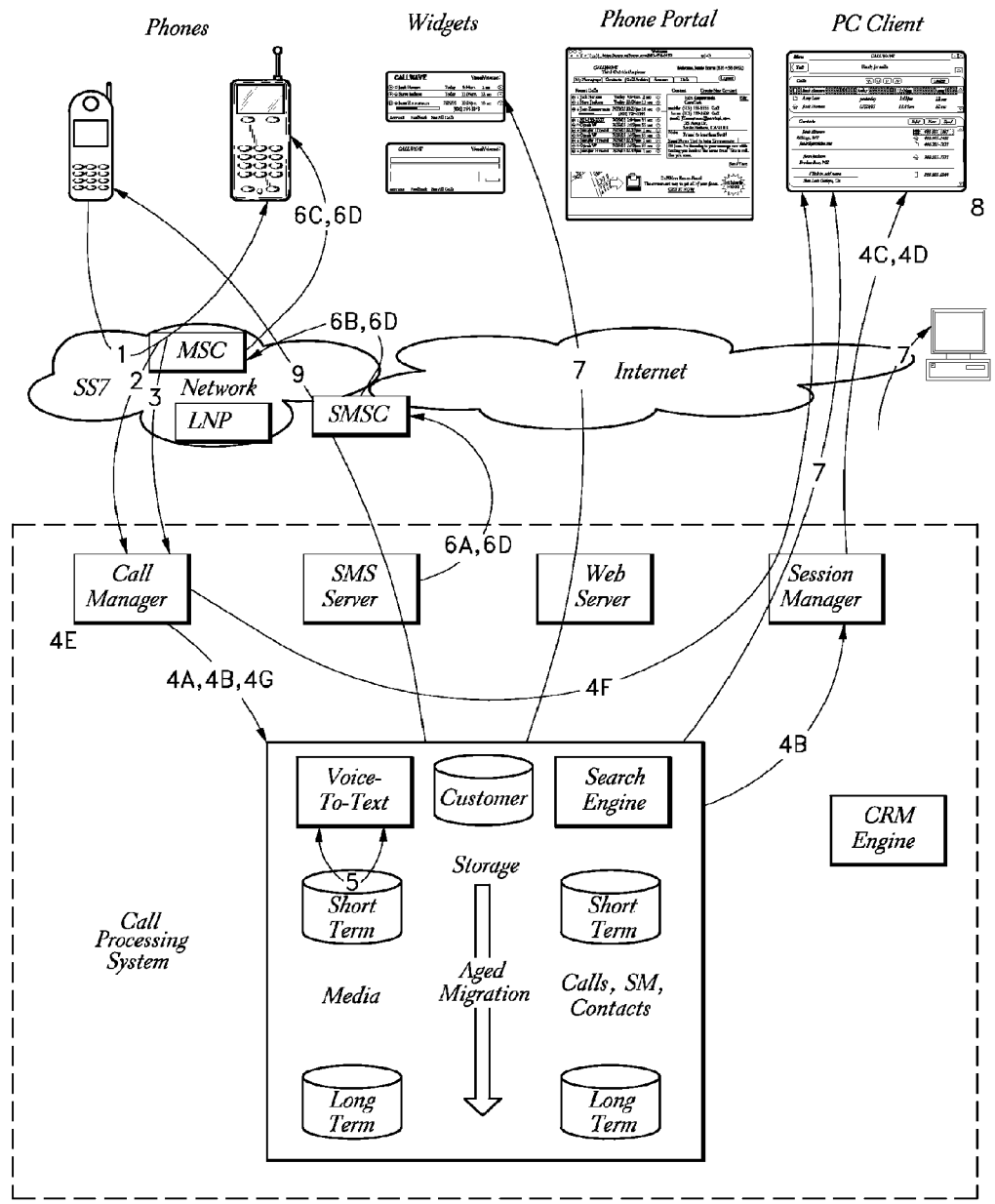
FIG. 6 illustrates an example operating environment/process for a call and text response.

FIG. 6 depicts an example embodiment in which a voice-to-text call processing system provides a service to a wireless subscriber of a carrier (e.g., a Carrier Partner). In this example embodiment, a caller calls a subscriber's mobile phone, the caller records a message, and the subscriber receives the "Gist" of the message on the subscriber's mobile phone. Later, the subscriber listens to a portion of the message from a Web 2.0 Desktop Widget and sends a text reply.

The example sequence of interactions is as follows:

State 1. A Caller dials the subscriber's mobile phone number/address (or other phone-type address). This call is routed through the PSTN to a carrier (e.g., a CP). In this example embodiment, the caller places a call to the Carrier Partner subscriber's mobile phone. The call routes through the SS7 network to the Mobile Switching System (MSC) currently serving the subscriber.

State 2. The MSC optionally detects a condition, (e.g., a WIN trigger set on the subscriber's phone address) and transmits a message over a network to the call manager so that the call manger can log the call and/or perform alternate routing (Optionally, this occurs whether or not the call eventually gets conditionally forwarded on a busy or no answer condition.)

State 3. In this example, the subscriber does not answer after a specified number of rings or amount of time. This no answer condition is detected by the MSC and causes the MSC to forward the call to the call manager (an enhanced service provider platform and/or call processing system) in accordance with a previously configured forwarding configuration. In the forwarded call, the MSC includes some or all of the call signaling information associated with the call, including, for example, the caller phone number/address, a privacy indicator, a designation of whether the call was a forwarded call, and/or the called party identifier (e.g., phone number/address or account number).

State 4A. The receiving call manager verifies the called phone address is that of a customer (e.g., a subscriber of a service offered by the operator of the call processing system and/or other entity having an account associated with the call processing system), optionally by determining if the called phone address or other identifier associated with the called party matches a customer number in the customer database (which stores customer account records).

State 4B. The call processing system queries the session manager to obtain some or all of the following: service configuration for the customer being called, the customer's call location, the customer's online status (e.g., online or offline), and contact information for the caller.

State 4C. Optionally, the session manager notifies the customer's telecommunications client (e.g., a Widget, a phone portal page, or telecommunication client as illustrated in FIG. 6) that there is an incoming call. The client displays the call in its active call window (e.g., a call alert user interface) with the status set to "ringing". A "Take Call" button on the telecommunications client is available to the customer to take action on the call (e.g., establish duplex communications with the caller, transfer the call, etc.)

State 4D. The call manager begins playing a greeting (e.g., a canned greeting or a greeting prerecorded by the customer, such as one that states the customer's name and/or asks the caller to leave a message) to the caller and the call processing system notifies the telecommunications client to cause the active call display to show "greeting caller".

State 4E. In this example, the subscriber is in a meeting (or otherwise unavailable) and is unable to screen or take the call. The call manager plays a record tone and begins recording a message from the caller.

State 4F. The call manager notifies the telecommunications client to change the active call display to "recording". The call manager then begins streaming the audio over the Internet to be played by the telecommunications client in substantially real-time.

State 4G. The call manager records a message and stores it. The call manager logs the call and optionally updates the call frequency information for the contact (e.g., the call manager tracks the total number of calls received from a given phone address and/or caller, wherein the "total number of calls" can be the total number of calls received from a specific date, within a specified time period, or otherwise). The telecommunications client or call log web page clears the active call display and optionally adds the call to the top of the call log. In this example, this is a new caller with respect to the subscriber, and so the call manager also queries a database (e.g., the CNAM database in the SS7 Network) to get the caller name. The call manager then automatically creates a new contact record for the caller (e.g., including the caller name and phone address).

State 5. The voice message is transcribed to text and stored in a call processing system database in association with a subscriber identifier. Optionally, one or more transcription passes are applied to the voice message. For example, a first pass transcription is applied to get the gist of the message as described above to communicate in a short message including the text (e.g., an SMS or MMS message). The gist message is optionally configured to be sufficiently concise (e.g., 160 7-bit characters, 140 8-bit characters, or 70 16-bit characters) so as to be transmittable via a single SMS message (or other short message). A second pass or full transcription follows in the background and the voice and text message is archived in a storage system.

State 6A. In this example, the subscriber is notified of the call and message on their wireless phone via SMS. The message contains text giving the gist of the voice message (e.g., urgency, call to action, recorded phone address). A Short Message Service or MMS service within the call processing system composes a Short Message (SM) or a multimedia message (MM), addresses it to the customer's mobile phone (or other device capable of receiving Short Messages or an MM designated by the subscriber via the telecommunications client or via the account management Web page) and sends the message to a Short Message Switching Center (SMSC). The session manager optionally stores a copy of the message in a data base or file system associated with the customer's account. Optionally, instead, the message text is provided to the Carrier Partner or other entity, which then transmits the text in a specified or desired format (e.g., SMS, MMS, email, or otherwise).

State 6B. The SMSC transmits the received message to the MSC.

State 6C. The MSC transmits a notification to the mobile phone informing the mobile phone (or other designated communications device) there is a message waiting.

State 6D. A Message Waiting Indicator (MWI) update is transmitted (e.g., using an SMPP interface over a data network) to update the MWI icon on the wireless phone.

State 7. In this example, the subscriber is also alerted of the call on the Carrier Partner branded voice mail widget and computer client on whichever of the subscriber's computers hosting the widget or client that is online.

State 8. After the meeting, the subscriber views the message (e.g., from the subscriber's computer) and sends a Reply to the message. In this example, the subscriber selects the message in the call log (optionally, the message was preselected as being the most recent message) and clicks on a control which opens a text reply window (or activates a text or SMS Widget or Phone Portal or other user interface which generates a communication addressed to the caller). The subscriber types a text message confirming the meeting and then selects the send control. The message send request is transmitted over a network from the client through the Web Server to the SMS Server.

State 9. The SMS Server transmits the message for delivery to the contact's wireless phone via the SMSC. The SMS Server logs the transaction including the text of the message. The text log is available to the subscriber for later review, search, and sorting.

While the above examples refer to calls forwarded to the call processing system (e.g., on a ring-no-answer condition), the calls optionally could have been placed to a virtual phone number associated with the customer and "owned" by the call processing system, so that calls to the virtual phone number are received at the call processing system without needing to be forwarded (e.g., which terminates directly on the call processing system). Further, while the above example refers to transmission of an SMS message over a mobile network to a customer mobile phone, other message types (e.g., email or instant messages) can be transmitted over other types of networks (e.g., an Internet protocol network) or other device types (e.g., an Internet protocol phone).

In the example above, state 4F refers to the streaming of the audio of the recording from the call manager over a data network to be played by the telecommunications client in substantially real-time. Optionally, the audio of the recording is transcribed from voice-to-text by the call processing system in substantially real-time. The transcribed text optionally is then transmitted to the telecommunications client in substantially real-time and displayed to the subscriber. Optionally, the subscriber can choose, via a user interface control, to take the call on the communications device displaying the text and/or playing the audio or redirect the call to another communications device. Optionally, activation of a "taking the call" control causes the call processing system to terminate recording/streaming, and to play an announcement to the caller (e.g., "the person you called would like to speak with you"). The call is then transferred and/or bridged to the subscriber.

Figure 7:
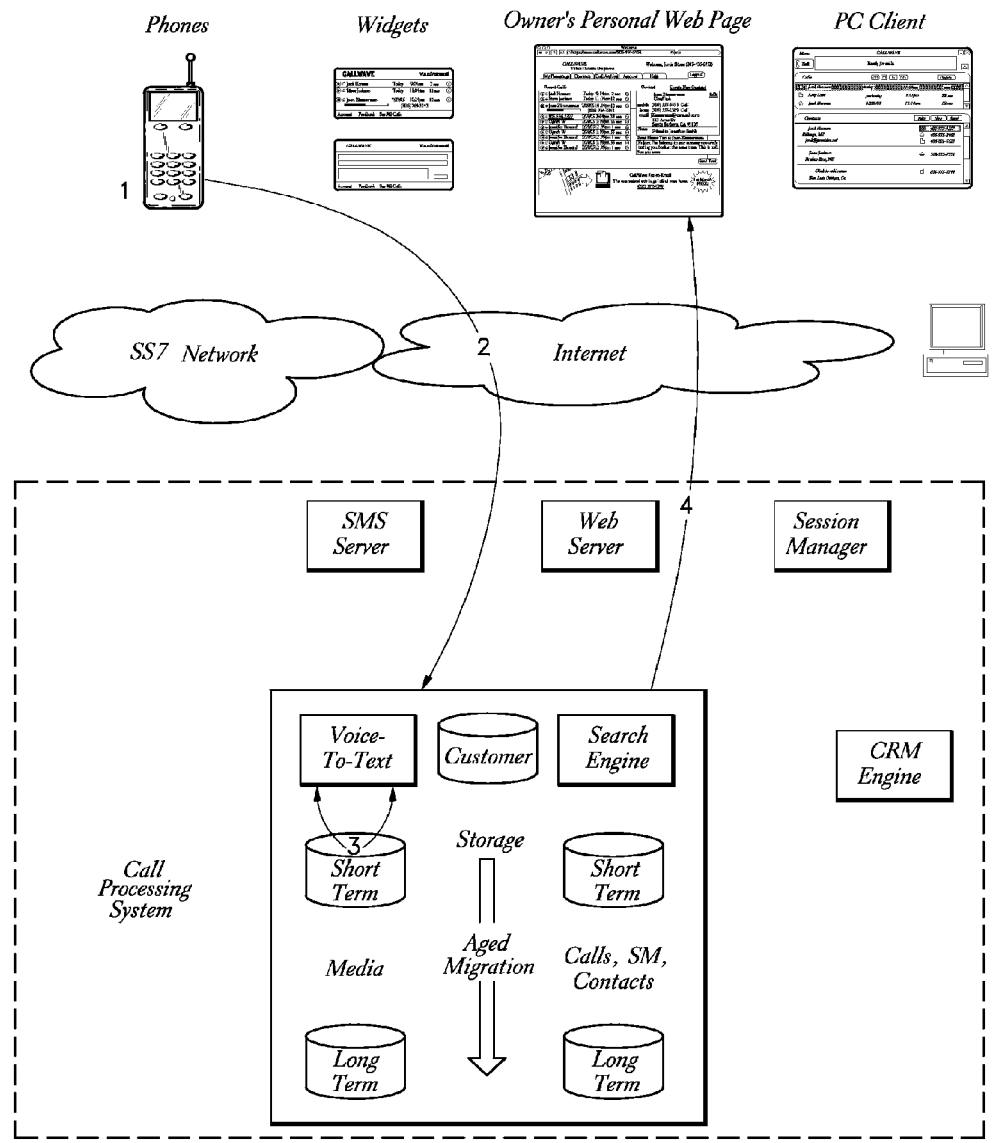
FIG. 7 illustrates an example operating environment/process for posting voice recordings on a personal web page.

FIG. 7 depicts another example embodiment in which a voice-to-text call processing system provides a service to a subscriber of a carrier (e.g., a Carrier Partner). In this example embodiment, a user (e.g., a social networking user) records a message via a communication device (e.g., a mobile handset), the message is transmitted to a voice-to-text call processing system which converts the message to text and/or a text-based gist version of the message, and the message (as a voice message and/or as a text message) is posted on the user's web page (e.g., a social networking web page via which the user can share information posted on the page with others) available to be viewed by visitors. Optionally instead, using a calling device (e.g., a wireless phone, a landline phone, an IP phone or other phone), the user calls a system that includes or that communicates with a voice-to-text call processing system, which records and converts the message to text and/or a text-based gist version of the message, and the message is posted on the user's web page available to be viewed by visitors.

Referring again to FIG. 7, the example sequence of interactions is as follows:

State 1. A web page owner (e.g., a MySpace.com® web page account holder) downloads (e.g., over the Internet) an application (or the application was previously loaded on the owner's mobile handset) from a service provider's web site to the owner's mobile handset (e.g., via a browser or other download software hosted on the phone or otherwise). The web page owner/user invokes the application (e.g., by clicking on an icon or a menu selection, or by providing a spoken instruction) which prompts the user via a visual display and/or sound (e.g., a beep tone and/or a verbal prompt) to record a message.

The message can be regarding an invitation to an event, the web page owner's activities, thoughts, availability, by way of example and not limitation. For example, the web page owner may want to publish his/her travels through the course of the day (e.g., "I'm heading out to the Acme Grocery Store on Upper State Street"), regarding what the owner's plans are (e.g., "I am going to Club Acme tonight at 10:30. You are invited to join me."). The application records the message and stores it in memory local to the phone (e.g., built-in RAM memory, non-volatile memory, a removable memory device, etc.).

State 2. The application transmits the recorded message to a voice-to-text call processing system (e.g., over a wireless data network) which stores the recorded message in memory (e.g., volatile or non-volatile short term memory and/or non-volatile long term memory).

State 3. The voice message is automatically and/or manually (e.g., by a human operator) transcribed to text by the voice-to-text system and stored in a call processing system database or other data store, in association with a subscriber identifier. Optionally, one or more transcription passes are applied to the voice message. For example, a first pass transcription is optionally applied to obtain the gist of the message as described above, to communicate the gist text in a message, such as a short message including the text (e.g., an SMS or MMS message). Optionally, a second pass or full transcription follows (e.g., in the background) and the voice and text message are archived in a storage system and transmitted to the web page owner's web page. Optionally, the entire message is transcribed in a first pass, and the gist is then identified.

State 4. In this example, the full transcription is posted on the page owner's web page for visitors to view (e.g., by accessing the web page via a browser on a computer system or other device that can access the web page). Optionally, the gist (or full transcription) of the message is transmitted to a collection of visitors/friends via a text messaging service (e.g., SMS, MMS, email, instant messaging, etc.). The web page owner configures the broadcast message distribution list (or visitors opt-in on the web page).

In the example embodiment, optionally, rather than an application running on the handset, the user calls (e.g., via speed dial or otherwise) a phone address, such as a pilot hunt group number, terminating on the voice-to-text call processing system. In addition, at State 2 above, the application could optionally stream in substantially real-time the message as it is being recorded to a voice-to-text call processing system. Optionally, the Web page includes a user interface (e.g., a text entry field and a send control) that enables a visitor to send a text message (e.g., a SMS) message.

Some or all of the foregoing services (e.g., phone management services, archive services, transcription services, gist services, social network posting services, etc.) can be enabled or displayed in a customer account record stored by the call processing system for a given subscriber. For example, certain service packages and/or service prices do not include the archival, transcription, and phone management services, and certain service packages and/or service prices include the archival, transcription, and phone management service.

It should be understood that certain variations and modifications of the systems and processes described herein would suggest themselves to one of ordinary skill in the art. The scope of the present invention is not to be limited by the illustrations or the foregoing descriptions thereof.

What is claimed is:

1. A system, comprising:
   at least one computing device comprising hardware;
   at least one network interface coupled to a Public Switched Telephone Network (PSTN);
   non-transitory memory coupled to the at least one computing device that stores instructions that when executed by the at least one computing device cause, at least in part, the system to implement:
   enabling a software application to be downloaded over a network to a computing device of a user;

recording a voice mail message from a caller;
transcribing some or all of the voice mail message from the caller, including a plurality of spoken words, to text using at least in part a speech-to-text recognizer;
creating a text message from a selected portion of the transcribed text wherein resolution of transcribed text ambiguities is based at least in part on using a context and/or location of a word or phrase in the voice mail message; and
transmitting the text message over the network to the user computing device for display by the software application, the software application hosted by the computing device of the user, wherein the display of the transcribed text for an uncertain word is grayed.

2. The system as defined in claim 1, wherein the user computing device comprises a mobile phone.

3. The system as defined in claim 1, wherein the location of the word or phrase resolution occurs at or near the beginning or at or near the end of the recorded voice mail message.

4. The system as defined in claim 1, wherein the software application comprises a web browser.

5. The system as defined in claim 1, wherein the network interface coupled to the PSTN comprises an Internet Protocol connection.

6. The system as defined in claim 1, the operations further comprising:
identifying one or more of the following in the voice mail message:
a pause;
a clause initial conjunction; or
a hesitation word.

7. A system, comprising:
at least one computing device comprising hardware;
at least one network interface coupled to a Public Switched Telephone Network (PSTN);
non-transitory memory coupled to an at least one networked computing device that stores a first instance of a software application configured to be installed on a computing device of a user, wherein the software application, when executed by the device of the user, is configured to receive and display text messages corresponding to voice messages transcribed to text and to receive transcription feedback from the user with respect to text messages corresponding to voice messages transcribed to text;
non-transitory memory coupled to the at least one computing device that stores instructions that when executed by the at least one computing device cause, at least in part, the system to implement:
receiving at the at least one network interface a call from a caller directed to a phone address, wherein the phone address is associated with the user;
recording a voice message from the caller;
transcribing some or all of the voice message, including a plurality of spoken words, to text using at least in part a speech-to-text recognizer;
creating a text message from at least a portion of the transcribed text; and
transmitting the text message over the network to the user computing device for display by a second instance of the software application,
wherein the second instance of the software application is hosted on the computing device of the user, and wherein the display of the transmitted text message to the user signals, for one or more transcribed words in the transmitted text message, an indication of the uncertainty of the word transcription, wherein the display of the transcribed text for an uncertain word is grayed, and
wherein the second instance of the software application is configured to enable the user to provide transcription feedback regarding the received text message.

8. The system as defined in claim 7, wherein the first phone address is associated with the user computing device.

9. The system as defined in claim 7, wherein the second instance of the software application comprises a web browser.

10. The system as defined in claim 7, wherein the network interface coupled to the PSTN comprises an Internet Protocol connection.

11. The system as defined in claim 7, the operations further comprising:
identifying one or more of the following in the voice message:
a pause;
a clause initial conjunction; or
a hesitation word.

12. A system, comprising:
at least one computing device comprising hardware;
at least one network interface coupled to a Public Switched Telephone Network (PSTN);
non-transitory memory coupled to an at least one networked computing device that stores a first instance of a software application configured to be installed on a computing device of a user, wherein the software application, when executed by the device of the user, is configured to receive and display text messages corresponding to voice messages transcribed to text and to receive transcription feedback from the user with respect to text messages corresponding to voice messages transcribed to text;
non-transitory memory coupled to the at least one computing device that stores instructions that when executed by the at least one computing device cause, at least in part, the system to implement:
receiving at the at least one network interface a call from a caller directed to a phone address, wherein the phone address is associated with the user;
recording a voice message from the caller;
transcribing some or all of the voice message, including a plurality of spoken words, to text using at least in part a speech-to-text recognizer;
creating a text message from at least a portion of the transcribed text; and
transmitting the text message over the network to the user computing device for display by a second instance of the software application,
wherein the second instance of the software application is hosted on the computing device of the user, and wherein the display of the transmitted text message to the user signals, for one or more transcribed words in the transmitted text message, an indication of the uncertainty of the word transcription, and
wherein the second instance of the software application is configured to enable the user to provide transcription feedback regarding the received text message, and wherein the display of the transcribed text for a relatively higher certainty word comprises a regular font or a bold text font.

13. A system, comprising:
at least one computing device comprising hardware;
at least one network interface coupled to a Public Switched Telephone Network (PSTN);

non-transitory memory coupled to an at least one networked computing device that stores a first instance of a software application configured to be installed on a computing device of a user, wherein the software application, when executed by the device of the user, is configured to receive and display text messages corresponding to voice messages transcribed to text and to receive transcription feedback from the user with respect to text messages corresponding to voice messages transcribed to text;

non-transitory memory coupled to the at least one computing device that stores instructions that when executed by the at least one computing device cause, at least in part, the system to implement:

receiving at the at least one network interface a call from a caller directed to a phone address, wherein the phone address is associated with the user;

recording a voice message from the caller;

transcribing some or all of the voice message, including a plurality of spoken words, to text using at least in part a speech-to-text recognizer;

creating a text message from at least a portion of the transcribed text; and transmitting the text message over the network to the user computing device for display by a second instance of the software application, wherein the second instance of the software application is hosted on the computing device of the user, and wherein the display of the transmitted text message to the user signals, for one or more transcribed words in the transmitted text message, an indication of the uncertainty of the word transcription, and wherein the second instance of the software application is configured to enable the user to provide transcription feedback regarding the received text message, and receiving, from the second instance of the software application over the network, an indication that at least a one or more word or phrase in the text message is erroneously transcribed.

14. A system, comprising:

at least one computing device comprising hardware;

at least one network interface coupled to a Public Switched Telephone Network (PSTN);

non-transitory memory coupled to an at least networked one computing device that stores a first instance of a software application configured to be downloaded to a computing device of a user;

non-transitory memory coupled to the at least one computing device that stores instructions that when executed by the at least one computing device cause, at least in part, the system to implement:

receiving at the at least one network interface a call from a caller directed to the user;

recording a voice message from the caller;

transcribing some or all of the voice message, including a plurality of spoken words, to text using at least in part a speech-to-text recognizer;

creating a text message from a selected portion of the transcribed text;

transmitting the text message over the network to a second instance of the software application, wherein the second instance of the software application is hosted on the computer device of the user;

displaying, via a user interface of the second instance of the software application, the second instance of the software application executing on the computing device of the user, the text message transmitted over the network, wherein the display of the transmitted text message to the user signals, for each transcribed word in the selected portion of the transcribed text, an indication of the uncertainty of the word transcription, wherein the display of the transcribed text for a higher certainty word comprises a regular font or a bold text font; and providing a user interface control via the user interface of the second instance of the software application that enables the user to send a text reply to the caller.

15. The system as defined in claim 14, wherein the user's computing device comprises a mobile phone.

16. The system as defined in claim 14, wherein the second instance of the software application comprises a web browser.

17. The system as defined in claim 14, wherein the coupled network interface to the PSTN comprises an Internet Protocol connection.

18. The system as defined in claim 14, the operations further comprising:

identifying one or more of the following in the voice message:

a pause;

a clause initial conjunction; or a hesitation word.

19. A system, comprising:

at least one computing device comprising hardware;

at least one network interface coupled to a Public Switched Tele shone Network PSTN;

non-transitory memory coupled to an at least networked one computing device that stores a first instance of a software application configured to be downloaded to a computing device of a user;

non-transitory memory coupled to the at least one computing device that stores instructions that when executed by the at least one computing device cause, at least in part, the system to implement:

receiving at the at least one network interface a call from a caller directed to the user;

recording a voice message from the caller;

transcribing some or all of the voice message, including a plurality of spoken words, to text using at least in part a speech-to-text recognizer;

creating a text message from a selected portion of the transcribed text;

transmitting the text message over the network to a second instance of the software application, wherein the second instance of the software application is hosted on the computer device of the user;

displaying, via a user interface of the second instance of the software application, the second instance of the software application executing on the computing device of the user, the text message transmitted over the network, wherein the display of the transmitted text message to the user signals, for each transcribed word in the selected portion of the transcribed text, an indication of the uncertainty of the word transcription;

providing a user interface control via the user interface of the second instance of the software application that enables the user to send a text reply to the caller;

receiving from the second instance of the software application over the network, a text message reply; and in response to receiving the text message reply from the second instance of the software application, sending, from the at least one computing device, an SMS message directed to the caller.

20. A system, comprising:
- at least one computing device comprising hardware;
- at least one network interface coupled to a Public Switched Telephone Network (PSTN);
- non-transitory memory coupled to an at least networked one computing device that stores a first instance of a software application configured to be downloaded to a computing device of a user;
- non-transitory memory coupled to the at least one computing device that stores instructions that when executed by the at least one computing device cause, at least in part, the system to implement:
  - receiving at the at least one network interface a call from a caller directed to the user;
  - recording a voice message from the caller;
  - transcribing some or all of the voice message, including a plurality of spoken words, to text using at least in part a speech-to-text recognizes;
  - creating a text message from a selected portion of the transcribed text;
  - transmitting the text message over the network to a second instance of the software application, wherein the second instance of the software application is hosted on the computer device of the user;
  - displaying, via a user interface of the second instance of the software application, the second instance of the software application executing on the computing device of the user, the text message transmitted over the network, wherein the display of the transmitted text message to the user signals, for each transcribed word in the selected portion of the transcribed text, an indication of the uncertainty of the word transcription, wherein the display of the transcribed text for an uncertain word is grayed; and
  - providing a user interface control via the user interface of the second instance of the software application that enables the user to send a text reply to the caller.

* * * * *